US012082274B2

(12) United States Patent
Salkintzis

(10) Patent No.: US 12,082,274 B2
(45) Date of Patent: *Sep. 3, 2024

(54) ACCESSING A 5G NETWORK VIA A NON-3GPP ACCESS NETWORK

(71) Applicant: Lenovo (Singapore) PTE. LTD., New Tech Park (SG)

(72) Inventor: Apostolis Salkintzis, Athens (GR)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,456

(22) Filed: May 1, 2023

(65) Prior Publication Data

US 2023/0269797 A1 Aug. 24, 2023

Related U.S. Application Data

(63) Continuation of application No. 17/275,917, filed as application No. PCT/EP2018/076246 on Sep. 27, 2018, now Pat. No. 11,683,847.

(51) Int. Cl.
*H04W 76/12* (2018.01)
*H04L 9/40* (2022.01)
(Continued)

(52) U.S. Cl.
CPC ......... *H04W 76/12* (2018.02); *H04L 12/4633* (2013.01); *H04L 63/0272* (2013.01);
(Continued)

(58) Field of Classification Search
CPC ........................... H04W 84/12; H04L 12/4633
(Continued)

(56) References Cited

U.S. PATENT DOCUMENTS

2009/0303966 A1* 12/2009 Cherian .............. H04W 12/062
370/331
2014/0185603 A1 7/2014 Kaippallimalil et al.
(Continued)

FOREIGN PATENT DOCUMENTS

WO 2014107358 A1 7/2014
WO 2018065052 A1 4/2018

OTHER PUBLICATIONS

3GPP, "3rd Generation Partnership Project; Technical Specification Group Services and System Aspects; Study on the Wireless and Wireline Convergence for the 5G system architecture (Release 16)", 3GPP TR 23.716 V1.0.0, Sep. 2018, pp. 1-134.
(Continued)

*Primary Examiner* — Fabricio R Murillo Garcia
(74) *Attorney, Agent, or Firm* — Kunzler Bean & Adamson

(57) ABSTRACT

For establishing network connections via a trusted gateway function, a method includes relaying a first set of messages of a first type between a remote unit and a mobile communication network via a non-3GPP access network, sending a connection setup request to the remote unit via the non-3GPP access network, and relaying subsequent messages of the first type between the remote unit and the mobile communication network via the non-3GPP access, where the first set of messages are encapsulated with a first encapsulation protocol and where the first set of messages initiate a registration procedure to the mobile communication network, where the connection request setup contains information for activating a second encapsulation protocol, where the subsequent messages are encapsulated with the second encapsulation protocol, and where the subsequent messages complete the registration procedure.

23 Claims, 15 Drawing Sheets

(51) Int. Cl.
  *H04L 12/46* (2006.01)
  *H04W 12/041* (2021.01)
  *H04W 60/00* (2009.01)
  *H04W 88/16* (2009.01)

(52) U.S. Cl.
  CPC ......... *H04W 12/041* (2021.01); *H04W 88/16* (2013.01); *H04L 12/4641* (2013.01); *H04W 60/00* (2013.01)

(58) Field of Classification Search
  USPC ....................................................... 455/411
  See application file for complete search history.

(56) References Cited

U.S. PATENT DOCUMENTS

| | | | | |
|---|---|---|---|---|
| 2016/0037576 | A1* | 2/2016 | Jeong | H04W 76/15 |
| | | | | 370/329 |
| 2019/0335330 | A1 | 10/2019 | Salkintzis | |
| 2021/0136582 | A1* | 5/2021 | Liu | H04W 12/08 |

OTHER PUBLICATIONS

3GPP, "3rd Generation Partnership Project; Technical Specification Group Services and System Aspects; Architecture enhancements for non-3GPP accesses (Release 15)", 3GPP TS 23.402 V15.3.0, Mar. 2018, pp. 1-314.

3GPP, "3rd Generation Partnership Project; Technical Specification Group Services and System Aspects; Procedures for the 5G System; Stage 2 (Release 15)", 3GPP TS 23.502 V15.3.0, Sep. 2018, pp. 1-330.

* cited by examiner

ACCESSING A 5G NETWORK VIA A NON-3GPP ACCESS NETWORK

FIELD

The subject matter disclosed herein relates generally to wireless communications and more particularly relates to establishing network connections via a trusted gateway function.

BACKGROUND

In Fifth Generation ("5G") networks, to connect to the Third Generation Partnership Project ("3GPP") core network, a trusted non-3GPP access network may implement a gateway function.

BRIEF SUMMARY

Methods for establishing network connections via a trusted gateway function are disclosed. Apparatuses and systems also perform the functions of the methods. One method (e.g., of a Trusted Non-3GPP Gateway Function ("TNGF")) for establishing network connections via a trusted gateway function includes relaying a first set of messages of a first type between a remote unit and a mobile communication network via a non-3GPP access network. Here, the first set of messages of the first type are encapsulated with a first encapsulation protocol. Additionally, the first set of messages of the first type initiates a registration procedure to the mobile communication network via the non-3GPP access network. The method includes sending a connection setup request to the remote unit via the non-3GPP access network. Here, the connection setup request contains information for activating a second encapsulation protocol. The method also includes relaying subsequent messages of the first type between the remote unit and the mobile communication network via the non-3GPP access network. Here, the subsequent messages of the first type are encapsulated with the second encapsulation protocol. Additionally, the subsequent messages of the first type complete the registration procedure.

Another method (e.g., of a TNGF) for establishing network connections via a trusted gateway function includes establishing a control plane connection with a remote unit over a non-3GPP access network during a registration procedure of the remote unit to a mobile communication network. Here, messages on the control plane connection are encapsulated with a first encapsulation protocol. The method includes forwarding a request from the remote unit to establish a data connection with the mobile communication network. Here, the request is received via the control plane connection. The method also includes establishing a plurality of user plane connections with the remote unit in response to the mobile communication network accepting the request. Here, messages on each of the plurality of user plane connections are encapsulated with the first encapsulation protocol.

One method (e.g., of a User Equipment ("UE")) for establishing network connections via a trusted gateway function includes communicating a first set of messages of a first type with a mobile communication network via a non-3GPP access network. Here, the first set of messages of the first type are encapsulated with a first encapsulation protocol. Additionally, the first set of messages of the first type initiates a registration procedure to the mobile communication network via the non-3GPP access network. The method includes receiving a connection setup request via the non-3GPP access network. Here, the connection setup request contains information for activating a second encapsulation protocol. The method also includes communicating subsequent messages of the first type with the mobile communication network via the non-3GPP access network. Here, the subsequent messages of the first type are encapsulated with the second encapsulation protocol. Additionally, the subsequent messages of the first type complete the registration procedure.

Another method (e.g., of a UE) for establishing network connections via a trusted gateway function includes establishing a control plane connection with a non-3GPP access network node during a registration procedure with a mobile communication system via a non-3GPP access network. Here, messages on the control plane connection are encapsulated with a first encapsulation protocol. The method includes sending a request to establish a data connection with the mobile communication network. Here, the request is sent via the control plane connection. The method also includes establishing a plurality of user plane connections with the access network node in response to the mobile communication network accepting the request. Here, messages on each of the plurality of user plane connections are encapsulated with the first encapsulation protocol.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The description of elements in each figure may refer to elements of proceeding figures. Like numbers refer to like elements in all figures, including alternate embodiments of like elements.

Figure 1:
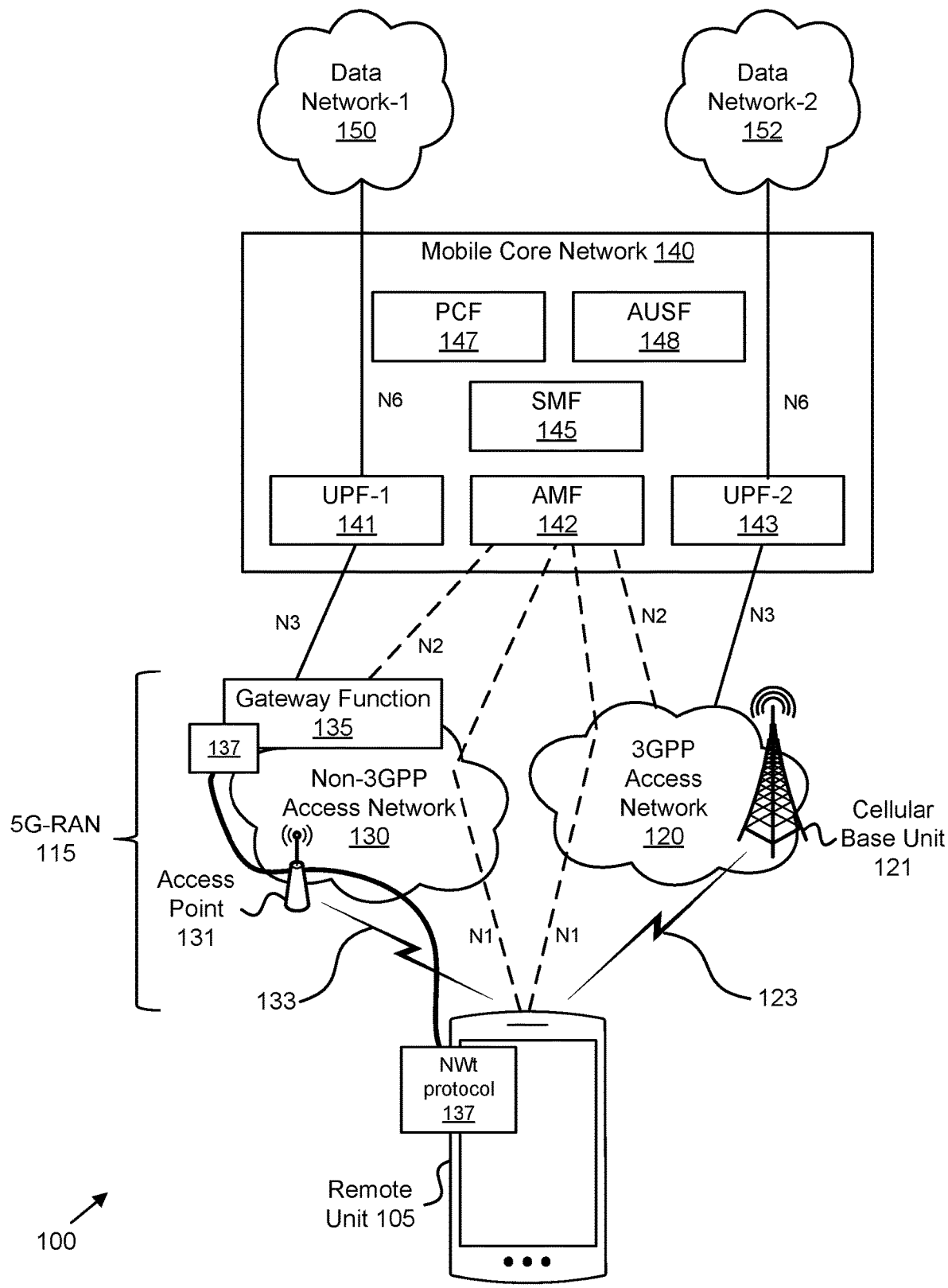
FIG. 1 illustrates an example of a wireless communication system that supports techniques for establishing network connections via a trusted gateway function, in accordance with aspects of the present disclosure.

FIG. 1 illustrates an exemplary wireless communication system 100 for establishing network connections via a trusted gateway function, in accordance with aspects of the present disclosure. In one embodiment, the wireless communication system 100 includes at least one remote unit 105, a 5G radio access network ("5G-RAN") 115, and a mobile core network 140. The 5G-RAN 115 and the mobile core network form a mobile communication network. The 5G-RAN 115 may be composed of a 3GPP access network 120 containing at least one cellular base station unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base station units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base station units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, Long-Term Evolution ("LTE") or Worldwide Interoperability for Microwave Access ("WiMAX"), among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, wireless transmit/receive unit ("WTRU"), a device, or by other terminology used in the art.

The remote units 105 may communicate directly with one or more of the cellular base station units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host via a network connection with the mobile core network 140. For example, an application (e.g., web browser, media client, telephone, Voice-over-Internet-Protocol ("VoIP") application) in a remote unit 105 may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and either the first data network 150 or the second data network 152 using the PDU session. Note that the remote unit 105 may establish one or more PDU sessions (or other data connections) with the mobile core network 140. As such, the remote unit 105 may have at least one PDU session for communicating with the first data network 150 and at least one PDU session for communicating with the second data network 152.

The cellular base station units 121 may be distributed over a geographic region. In certain embodiments, a cellular base station unit 121 may also be referred to as an access terminal, a base, a base station, base unit, a Node-B, an evolved Node-B ("eNB"), a Next Generation (e.g., 5G) Node-B ("gNB"), a Home Node-B, a relay node, a device, or by any other terminology used in the art. The cellular base station units 121 are generally part of a radio access network ("RAN"), such as the 3GPP access network 120, that may include one or more controllers communicably coupled to one or more corresponding cellular base station units 121. These and other elements of radio access network are not illustrated but are well known generally by those having ordinary skill in the art. The cellular base station units 121 connect to the mobile core network 140 via the 3GPP access network 120.

The cellular base station units 121 may serve a number of remote units 105 within a serving area, for example, a cell or a cell sector, via a wireless communication link 123. The cellular base station units 121 may communicate directly with one or more of the remote units 105 via communication signals. Generally, the cellular base station units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base station units 121.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via a gateway function 135. The gateway function 135 provides a gateway between the non-3GPP access network 130 and the mobile core network 140. The gateway function 135 supports connectivity via the "N2" and "N3" interfaces. As depicted, both the 3GPP access network 120 and the gateway function 135 communicate with the AMF 142 using a "N2" interface. The gateway function 135 also communicates with the first UPF 141 (denoted "UPF-1") using a "N3" interface, while the 3GPP access network 120 communicates with the second UPF 143 (denoted "UPF-2") using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. A gateway function 135 deployed in a trusted non-3GPP access network 120 may be referred to herein as a Trusted Network Gateway Function ("TNGF").

In one embodiment, the mobile core network 140 is a 5G core ("5GC") or the evolved packet core ("EPC"), which may be coupled to a data network, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a first UPF 141 and a second UPF 143. In the depicted embodiment, the first UPF 141 serves the non-3GPP access network 130 and the second UPF 143 serves the 3GPP access network 120. In other embodiments, the first UPF 141 (or second UPF 143) may serve both the 3GPP access network 120 and the non-3GPP access network 130.

The mobile core network 140 also includes multiple control plane functions including, but not limited to, an AMF 142 that serves both the 3GPP access network 120 and the non-3GPP access network 130, a Session Management Function ("SMF") 145, and a Policy Control Function ("PCF") 147. In certain embodiments, the mobile core network 140 may also include an Authentication Server Function ("AUSF") 148, a Unified Data Management function ("UDM"), a Network Repository Function ("NRF") (used by the various NFs to discover and communicate with each other over Application Programming Interfaces ("APIs")), or other NFs defined for the 5GC. Although specific numbers and types of network functions are depicted in FIG. 1, one of skill in the art will recognize that any number and type of network functions may be included in the mobile core network 140.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., Next Generation Radio Access Network ("NG-RAN")) and the second type of access (e.g., non-3GPP access network 130) uses a non-3GPP-defined type of wireless communication (e.g., wireless local area network ("WLAN")). The 5G-RAN 115 refers to any type of 5G access network that can provide access to the mobile core network 140, including the 3GPP access network 120 and the non-3GPP access network 130.

As described in greater detail below, the remote unit 105 may connect to the mobile core network 140 via a trusted non-3GPP access network 130. Disclosed herein is a layer-2, NAS and User Plane transport solution that uses a new protocol between the remote unit 105 (e.g., a UE) and the gateway function 135 of the trusted network, called "NWt protocol." The NWt protocol is used to set up an NWt control plane ("CP") connection between the remote unit 105 (e.g., a UE) and the gateway function 135 of the trusted network. This connection carries NWt packets that encapsulate NAS messages, and is assigned a specific Virtual Local Area Network ("VLAN") Identifier ("ID"). The NWt protocol is also used to set up one or more NWt user plane ("UP") connections between the UE and TNGF. Each such connection carries NWt packet that encapsulate PDU session data for one or more Quality of Service ("QoS") flows. Each NWt UP connection is also assigned a specific VLAN ID. The VLAN ID provides an identity of a NWt connection.

In various embodiments, the remote unit(s) 105 and the gateway function(s) 135 implement instances of a NWt protocol layer 137 that carry out the NWt protocol functions described herein. In some embodiments, the NWt protocol layer 137 operates above Ethernet/802.11. In such embodiments, there is no need for layer-3 connectivity between the remote unit(s) 105 and the gateway function(s) 135 of the trusted network. Consequently, there is no need for a layer-3 security association between the remote unit(s) 105 and the gateway function(s) 135 of the trusted network. Rather, only a layer-2 security association is needed.

Figure 2:
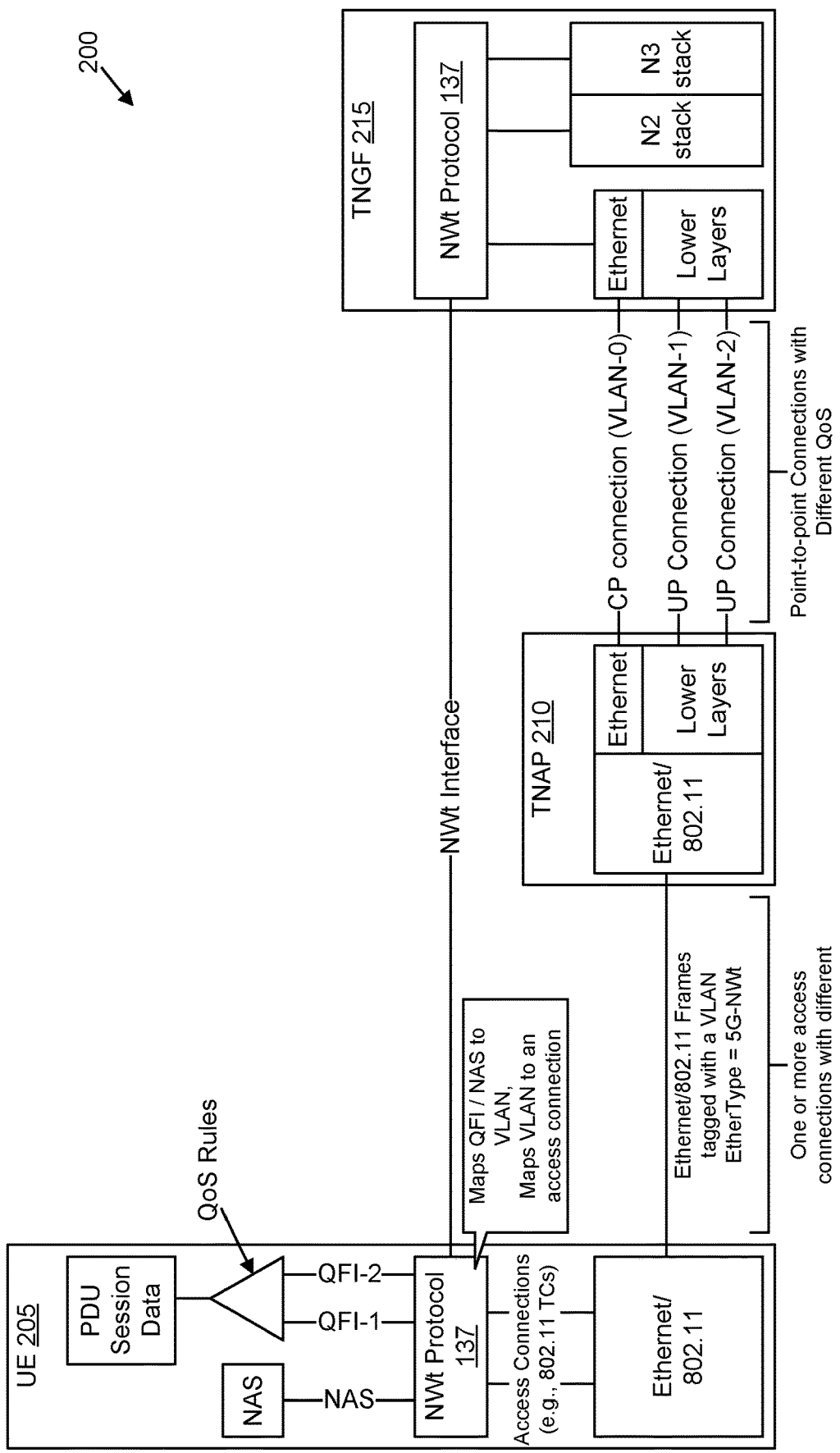
FIG. 2 illustrates an example of a network architecture that supports techniques for establishing network connections via a trusted gateway function, in accordance with aspects of the present disclosure.

FIG. 2 illustrates an exemplary network architecture 200 for establishing network connections via a trusted gateway function, in accordance with aspects of the present disclosure. The network architecture 200 includes a UE 205, a Trusted Network Access Point ("TNAP") 210, and a TNGF 215. The network architecture 200 may be a simplified embodiment of the wireless communication system 100, wherein the UE 205 is one embodiment of the remote unit 105, the TNAP 210 is one embodiment of an access point 131 deployed in a trusted non-3GPP access network 120, and the TNGF 215 is one embodiment of the gateway function 135 deployed in the trusted non-3GPP access network. The network architecture 200 implements the NWt protocol between the UE 205 and the TNGF 215. Depicted is a NWt protocol layer 137 in the protocol stacks of the UE 205 and TNGF 215.

The UE 205 encapsulates PDU session data and NAS messages into NWt packets, which are further encapsulated into Ethernet/802.11 frames, each one tagged with a new EtherType (e.g., EtherType=5G_NWt) and with a VLAN ID. Note that all NWt packets, including the "connection setup request to the remote unit" (discussed in detail below) and NWt packets carrying user-plane traffic, are transferred over Ethernet/802.11 frames tagged with the special EtherType, e.g., EtherType=5G_NWt. The UE 205 determines from the EtherType if a received frame contains an NWt packet (i.e., in contrast to a normal Internet Protocol ("IP") packet). From the VLAN ID, the UE 205 determines the NWt connection (e.g., a control plane NWt connection or a specific user plane NWt connection) associated with the received frame. The various NWt connections and associated VLAN IDs are discussed below with reference to FIG. 3.

Referring again to FIG. 2, the TNAP 210 forwards all frames received from the UE 205 with EtherType=5G_NWt to the TNGF 215. In some embodiments, there may be multiple point-to-point connections between the TNAP 210 and the TNGF 215. In such embodiments, each point-to-point connection is associated with a specific VLAN ID and with certain QoS parameters (e.g., a certain DiffServ Code Point ("DSCP") value). For example, one point-to-point connection might be used to carry NWt packets that contain NAS messages, and another point-to-point connection might be used to carry NWt packets that contain data for a specific PDU session and QoS flow. The TNAP 210 uses the VLAN ID in a received frame from the UE 205 to select the point-to-point connection that should be used to forward the frame to TNGF 215.

Note that the TNAP 210 forwards to the TNGF 215 only frames that contain EtherType=5G_NWt or EtherType=802.1X (as explained below). Thus, non-seamless offload traffic (i.e., traffic that should not go through the 5GC) is handled by the TNAP 210 with existing procedures and is not sent to TNGF 215. Rather, the TNGF 215 receives only the traffic (e.g., NAS and PDU session data) that goes through the 5GC (e.g., the mobile core network 140).

The UE 205 tags all Ethernet/802.11 frames that carry NAS messages with a specific VLAN ID. This VLAN ID is assigned by the TNGF 215 when a new NWt CP connection is set up between the UE 205 and TNGF 215. NWt CP connection setup is discussed in detail with reference to FIGS. 4A-4B. Similarly, the UE 205 tags all Ethernet/802.11 frames that carry PDU session data (for one or more QoS flows) with a specific VLAN ID. This VLAN ID is again assigned by the TNGF 215 when a new NWt UP connection is setup between the UE 205 and TNGF 215. NWt UP connection setup is discussed in detail with reference to FIGS. 5A-5B. During the NWt UP connection setup, the TNGF 215 indicates the QoS flows (one or more QFIs) that should be used over the NWt UP connection.

Between the UE 205 and the TNAP 210, one or more access-specific connections may be established (if supported by the non-3GPP access technology). Each access-specific connection (also referred to as "access connection") has different QoS, e.g., a different 802.11 Traffic Class ("TC"). When the UE 205 transmits an Ethernet/802.11 frame tagged with a certain VLAN ID, it maps the VLAN ID to an access connection. The mapping between a VLAN ID and an access connection is created in the UE 205 when an NWt CP/UP connection is established. Mapping a VLAN ID to an access connection is discussed in further detail below with reference to FIGS. 6 and 7.

Figure 3:
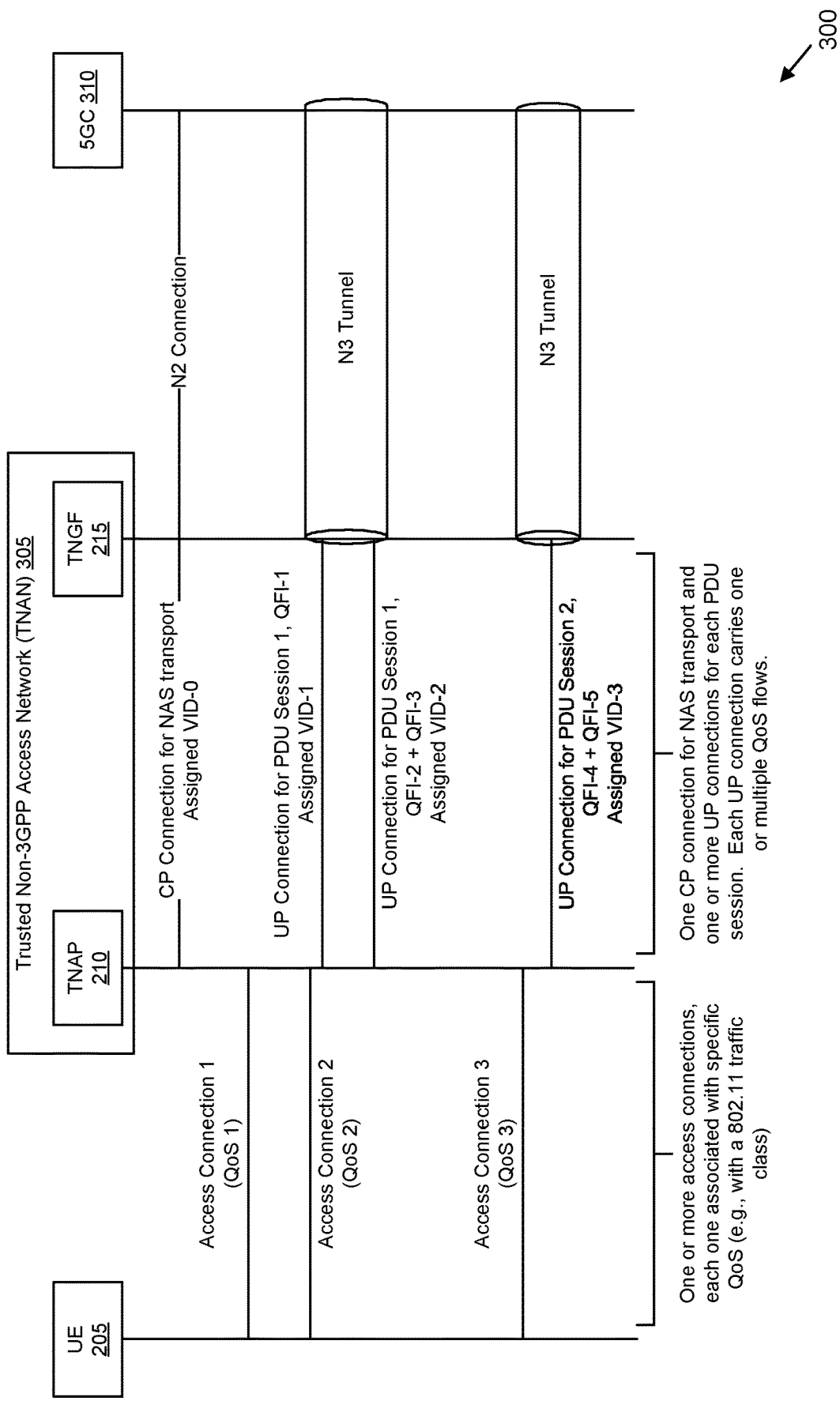
FIG. 3 illustrates an example of connections of various types that supports techniques for establishing network connections via a trusted gateway function, in accordance with aspects of the present disclosure.

FIG. 3 illustrates examples of the various connections that may be established between the UE 205 and the Trusted Non-3GPP Access Network ("TNAN") 305 and between the TNAN 305 and 5GC 310, in accordance with aspects of the present disclosure. The TNAN 305 includes a TNAP 210 and a TNGF 215 and may be one embodiment of a trusted deployment of the non-3GPP access network 130. The 5GC 310 may be a 5G deployment of the mobile core network 140.

As shown in FIG. 3, a dedicated point-to-point NWt CP connection exists between the TNAP 210 and TNGF 215 for NAS transport and one or more NWt UP connections exist between the TNAP 210 and TNGF 215 for every PDU session. Each of these connections is assigned a VLAN ID (denoted as "VID"), which is used by the TNAP 210 for forwarding uplink traffic to TNGF 215 and by the TNGF 215 for forwarding downlink traffic to TNAP 210. The TNGF 215 communicates CP messages (e.g., NAS messages received on the point-to-point CP connection) with the 5GC 310 using a N2 connection (e.g., to the AMF 142). The TNGF 215 communicates UP messages (e.g., PDU data received on the point-to-point UP connections) with the 5GC 310 using an N3 tunnel. As depicted, each PDU session may have its own N3 tunnel between the TNGF 215 and 5GC 310.

Figure 4A:
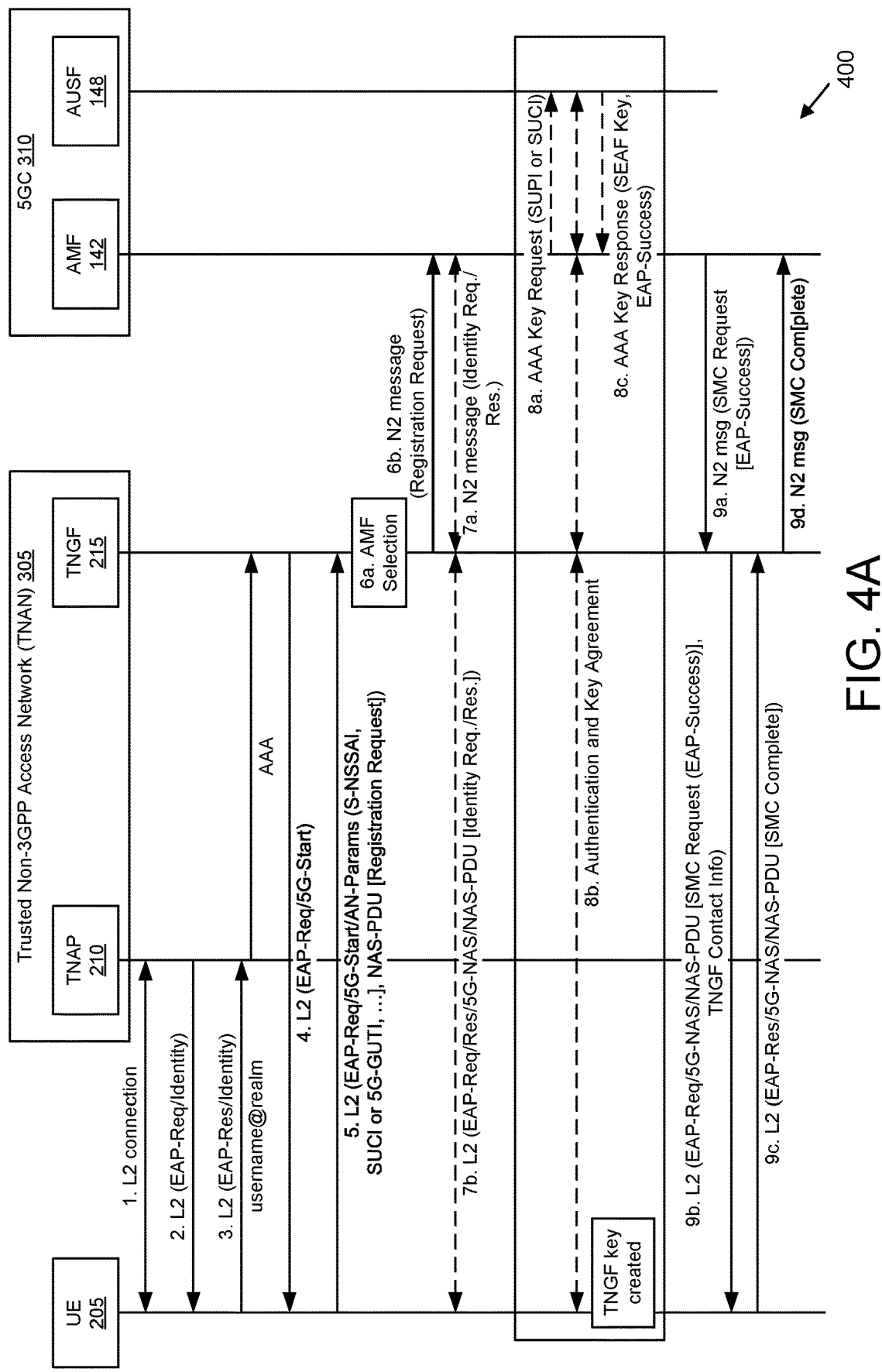
FIG. 4A illustrates an example of a network procedure for registering with the mobile communication network and establishing a control plane connection, in accordance with aspects of the present disclosure.
Figure 4B:
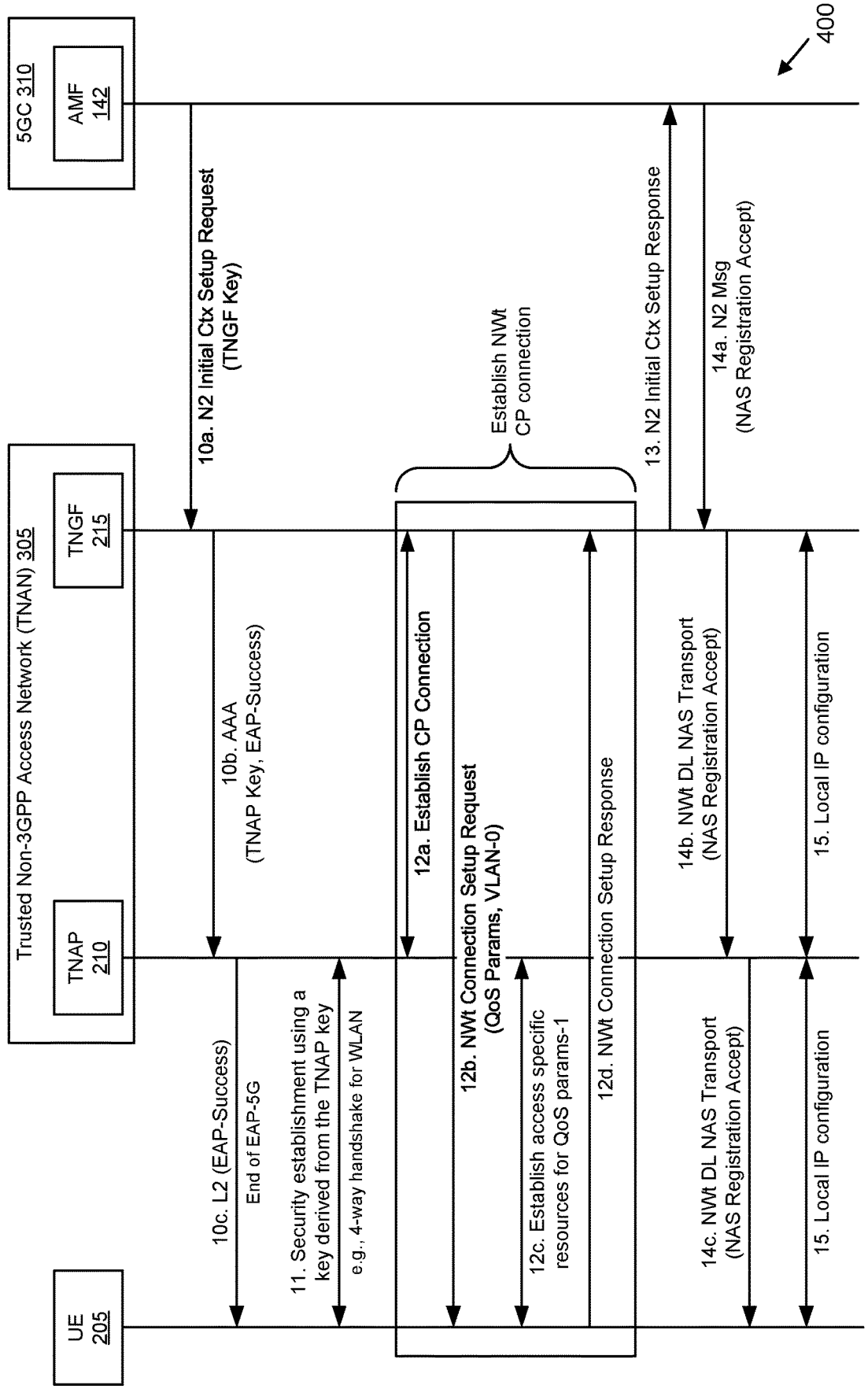
FIG. 4B is a continuation of FIG. 4A.

FIGS. 4A-4B illustrate an exemplary network procedure 400 for registering with the mobile communication network and establishing a control plane connection, in accordance with aspects of the present disclosure. The network procedure 400 describes how an NWt CP connection is established between the UE and TNGF, during the 5GC registration procedure. The NWt CP connection may be created when the 5GC requests from TNGF to establish a UE context and provides the TNGF key (e.g., when the AMF sends message 10a). The network procedure 400 involves the UE 205, the TNAN 305 (including a TNAP 210 and a TNGF 215), and the 5GC 310 (an AMF 142 and AUSF 148 are shown in the 5GC 310, other NFs in the 5GC 310 are not shown for ease of illustration).

Referring to FIG. 4A, the network procedure 400 begins. In step 1, a layer-2 connection is established between the UE 205 and the TNAP 210. In the case where the TNAP is a WLAN access point conforming to the Institute of Electrical and Electronics Engineers ("IEEE") 802.11 family of standards, step 1 corresponds to an 802.11 Association. In the case where the TNAP 210 uses the Point-to-Point Protocol ("PPP"), step 1 corresponds to a PPP Link Control Protocol ("LCP") negotiation. Note that in other types of non-3GPP access (e.g., Ethernet), this step may not be required.

In steps 2-3, an Extensible Authentication Protocol ("EAP") authentication procedure is initiated. The EAP messages are encapsulated into layer-2 packets, e.g., into IEEE 802.3/802.1x packets, into IEEE 802.11/802.1x packets, into PPP packets, etc. In various embodiments, the UE 205 provides a special Network Access Identifier ("NAI") that triggers the TNAP 210 to send an Authentication, Authorization, and Accounting ("AAA") request to a TNGF-CP entity, which operates as an AAA proxy. Between the TNAP 210 and TNGF-CP entity, the EAP packets are encapsulated into AAA messages.

In steps 4-10, an EAP-5G procedure is executed wherein the UE 205 registers with the 5GC 310. In these steps, all NAS messages exchanged between the UE 205 and TNGF 215 are encapsulated into EAP-5G packets, which are further encapsulated into Ethernet/802.11 frames that contain EtherType=802.1X. If, in step 4, the UE 205 does not receive an EAP-Request/5G-Start packet, then the UE 205 determines that the non-3GPP access network does not support registration to 5GC. Then, it is up to the UE implementation to continue or stop the access authentication procedure.

In step 5, the UE 205 sends a NAS Registration Request message. In steps 6, the TNGF 215 forwards the NAS Registration Request after selecting an AMF (here, the AMF 142). In steps 8, the UE 205 is authenticated with the 5GC 310. Note that the UE 205 creates a TNGF key after successful authentication and also derives a TNAP key from the TNGF key. The TNGF key is also created in the AMF 142 after the successful authentication.

In step 9b the UE 205 receives the "TNGF Contact Info" which includes the Medium Access Control ("MAC") address of the TNGF 215 to which NAS signaling should be sent. Alternatively, the "TNGF Contact Info" may be retrieved by the UE 205 after step 11, e.g., via Dynamic Host Configuration Protocol ("DHCP").

Continuing at FIG. 4B, the TNGF key is transferred from the AMF 142 to the TNGF 215 in step 10a. Here, TNGF key transfer occurs within the N2 Initial Context Setup Request. The TNGF 215 derives a TNAP key from the TNGF key, which is then sent to the TNAP 210 in step 10b (within an AAA message).

In step 11, the common TNAP key is used by the UE 205 and TNAP 210 to establish a security association to protect all subsequent traffic. In the case where the TNAP 210 is a WLAN access point conforming to the IEEE 802.11 family of standards, the TNAP key is used as an 802.11 Pairwise Master Key ("PMK") and a 4-way handshake is executed, which establishes a security association between the WLAN access point (e.g., an implementation of the TNAP 210) and the UE 205 that is used to protect unicast and multicast traffic over the air.

In step 12a, after security is established between the UE 205 and TNAP 210, the TNAP 210 initiates the establishment of a point-to-point CP connection with the TNGF 215. The TNGF 215 assigns to this connection a VLAN ID (e.g., VLAN-0) and specific QoS parameters (e.g., a DSCP value). The point-to-point CP connection is to transfer Ethernet frames tagged with VLAN-0 and EtherType=5G_NWt between the TNAP 210 and TNGF 215, e.g., Ethernet frames that carry NAS messages.

In step 12b, the TNGF 215 sends an NWt Connection Setup Request message to the UE 205. This message indicates to the UE 205 that a new NWt CP connection with the TNGF 215 is requested, which is assigned a certain VLAN ID (e.g., VLAN-0) and QoS parameters. Note that the connection setup request creates the NWt CP connection, and all messages sent on this connection are tagged with VLAN-0 and EtherType=5G_NWt.

In step 12c, the UE 205 may reserve access-specific resources for the NWt CP connection based on the received QoS parameters. In step 12d, the UE 205 responds with a NWt Connection Setup Response message. In step 13, the TNGF 215 sends an N2 Initial Context Setup Response informing the AMF 142 that a UE context and a signaling connection (i.e., a NWt CP connection) with the UE 205 have been created.

Referring to step 14, the TNGF 215 receives a NAS Registration Accept message. The TNGF 215 encapsulates the NAS Registration Accept message into an NWt DL NAS Transport message, which is further encapsulated into an Ethernet frame tagged with VLAN-0, EtherType=5G-NWt and destined to the MAC address of the UE 205. This Ethernet frame is forwarded to the TNAP 210 via the established point-to-point CP connection, which is associated with VLAN-0 and then from TNAP 210 to UE 205.

At step 15, the TNAP 210 may assign to the UE 205 (e.g., with DHCP) local IP configuration data, which can be used for non-seamless offload traffic. Note that the UE 205 sends the non-seamless offload traffic with EtherType other than "5G-NWt", so this traffic is not forwarded to TNGF 215.

Figure 5A:
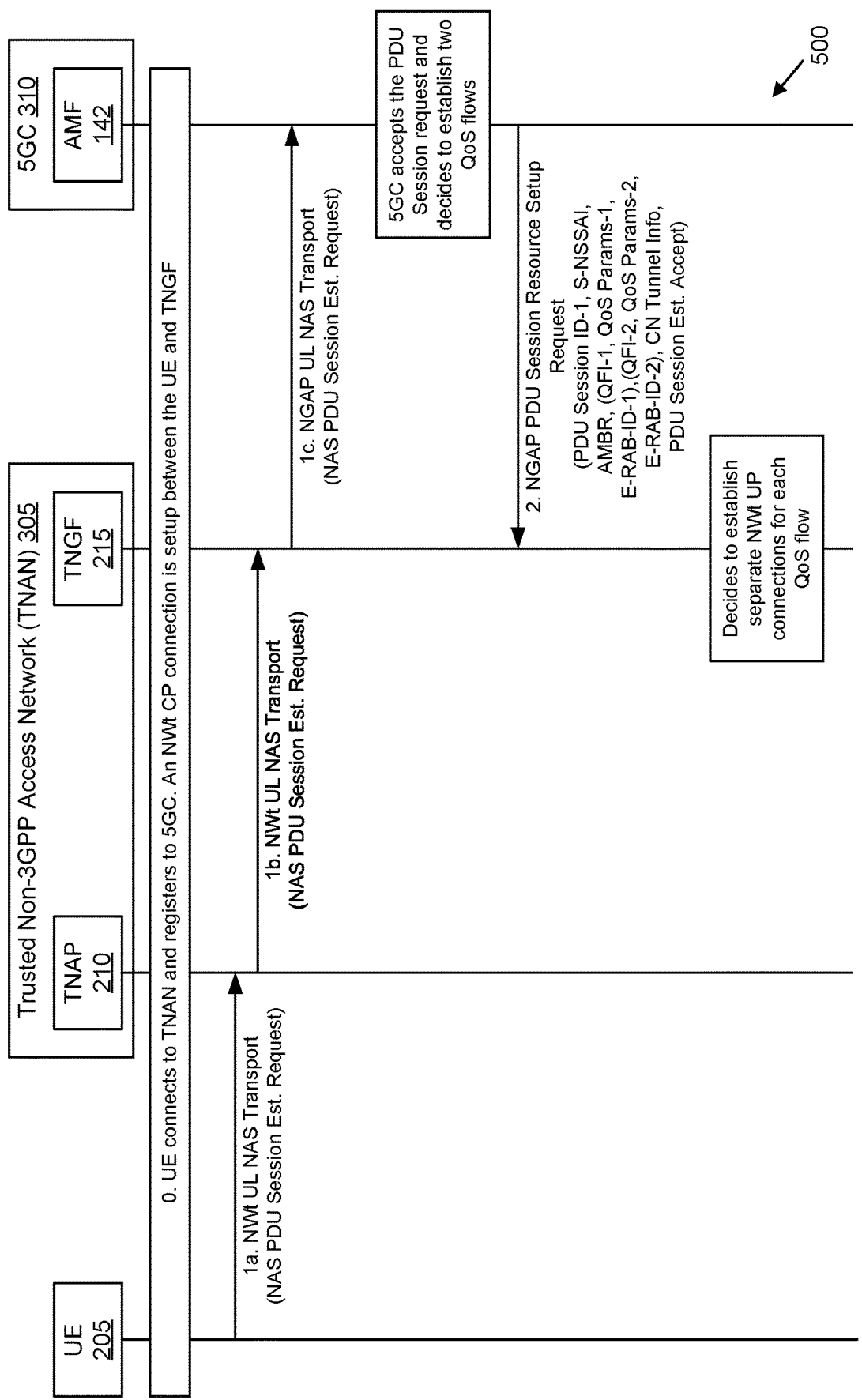
FIG. 5A illustrates an example of a network procedure for establishing user plane connections, in accordance with aspects of the present disclosure.
Figure 5B:
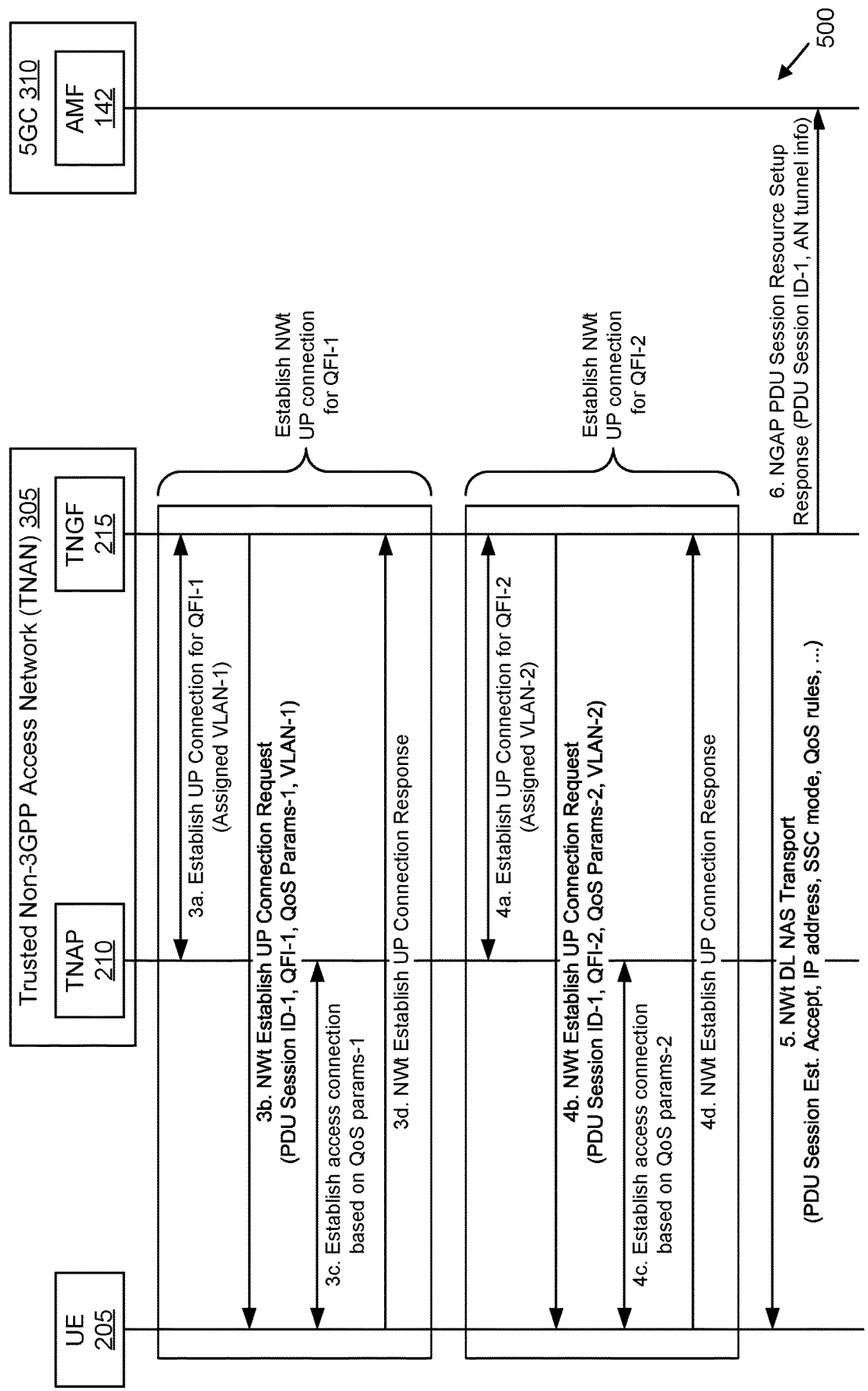
FIG. 5B is a continuation of FIG. 5A.

FIGS. 5A-5B illustrate an exemplary network procedure 500 for establishing user plane connections, in accordance with aspects of the present disclosure. The network procedure 500 specifies how one or more NWt UP connections are created between the UE and TNGF, during the establishment of a PDU session. The network procedure 500 involves the UE 205, the TNAN 305 (including a TNAP 210 and a TNGF 215), and the 5GC 310 (including an AMF 142, other NFs in the 5GC 310 are not shown for ease of illustration).

Referring to FIG. 5A, the network procedure 500 begins. In step 1, over the established NWt CP connection the UE 205 sends to the TNGF 215 an NWt UL NAS Transport message, which encapsulates a NAS PDU Session Establishment Request. This NAS message is forwarded to the AMF 142. In step 2, the 5GC 310 accepts the PDU session request and decides to use two QoS flows for transferring the traffic of the PDU session. Therefore, the next-generation access point ("NGAP") message sent to TNGF 215 includes two QoS Flow Identifiers ("QFIs") and the QoS parameters for each one (including 5G QoS Indicator ("5QI"), Allocation/Retention Policy ("ARP"), etc.). In one embodiment, the TNGF 215 decides to establish a dedicated NWt UP connection for each QoS flow.

Referring to FIG. 5B, in step 3, the TNGF 215 initiates the establishment an NWt UP connection for the first QoS flow. Here, a NWt UP connection is similar to a Data Radio Bearer, but instead of being identified with a radio bearer ID, it is identified with a VLAN ID. The TNGF 215 assigns VLAN-1 to the NWt UP connection, it establishes a point-to-point UP connection with the TNAP 210 using the QoS params-1 and sends a NWt Establish UP Connection Request to the UE 205 via the established NWt CP connection. This request informs the UE 205 that a new NWt UP connection has been established, which is associated with PDU session ID-1, QFI-1, QoS params-1 and VLAN-1. The UE 205 may reserve access-specific resources for this NWt UP connections (based on QoS params-1), and the UE 205 responds to the TNGF 215.

In step 4, an NWt UP connection for the second QoS flow is established using similar techniques as in step 3. This second NWt UP connection is assigned VLAN-2.

In step 5, over the established NWt CP connection, the TNGF 215 sends to UE 205 an NWt DL NAS Transport message, which encapsulates the NAS PDU Session Establishment Accept (e.g., received in step 2). In step 6, the TNGF 215 informs the AMF 142 that the necessary access resources for the PDU session have been set up.

Figure 6:
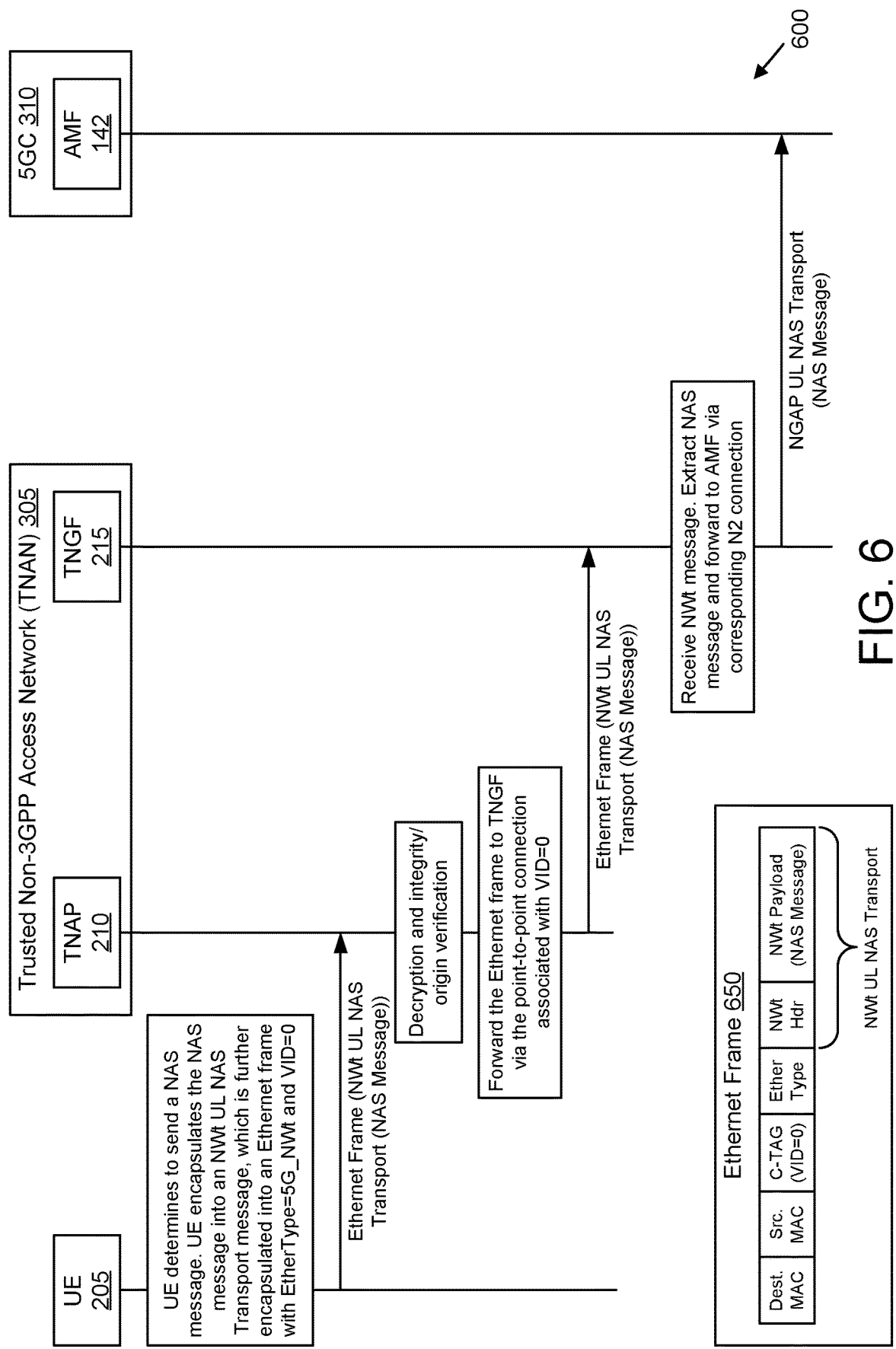
FIG. 6 illustrates an example of a procedure for forwarding a Non-Access Stratum ("NAS") message from the UE to the Access and Mobility management Function ("AMF") using a control plane connection, in accordance with aspects of the present disclosure.

FIG. 6 illustrates an exemplary network procedure 600 for forwarding a NAS message from the UE to the AMF using a control plane connection, in accordance with aspects of the present disclosure. Similar operations are conducted in the opposite direction (e.g., to send a NAS message from the AMF to the UE). The network procedure 600 involves the UE 205, the TNAN 305 (including a TNAP 210 and a TNGF 215), and the 5GC 310 (including the AMF 142, other NFs in the 5GC 310 are not shown for ease of illustration).

The network procedure 600 begins and the UE 205 determines to send a NAS message to 5GC 310. The UE 205 encapsulates the NAS message into an NWt UL NAS Transport message, which is further encapsulated into an Ethernet frame 650 with EtherType=5G_NWt and VID=0. The destination MAC is set to the MAC address of the TNGF 215, the source MAC is set to the MAC address of the UE 205, and the NWt header indicates the NWt payload contains a NAS message. In this embodiment, NAS transport is mapped to VLAN ID 0 (i.e., VID=0). The VLAN ID 0 in turn is mapped to an appropriate 802.11 TC.

After verifying the integrity and the origin of the Ethernet/802.11 frame, the TNAP 210 forwards the Ethernet/802.11 frame to the TNGF 215 via the point-to-point connection associated with VLAN ID 0. The TNGF 215 receives the NWt message, extracts the NAS message, and forwards the NAS message to the AMF 142 via the corresponding N2 connection.

Figure 7:
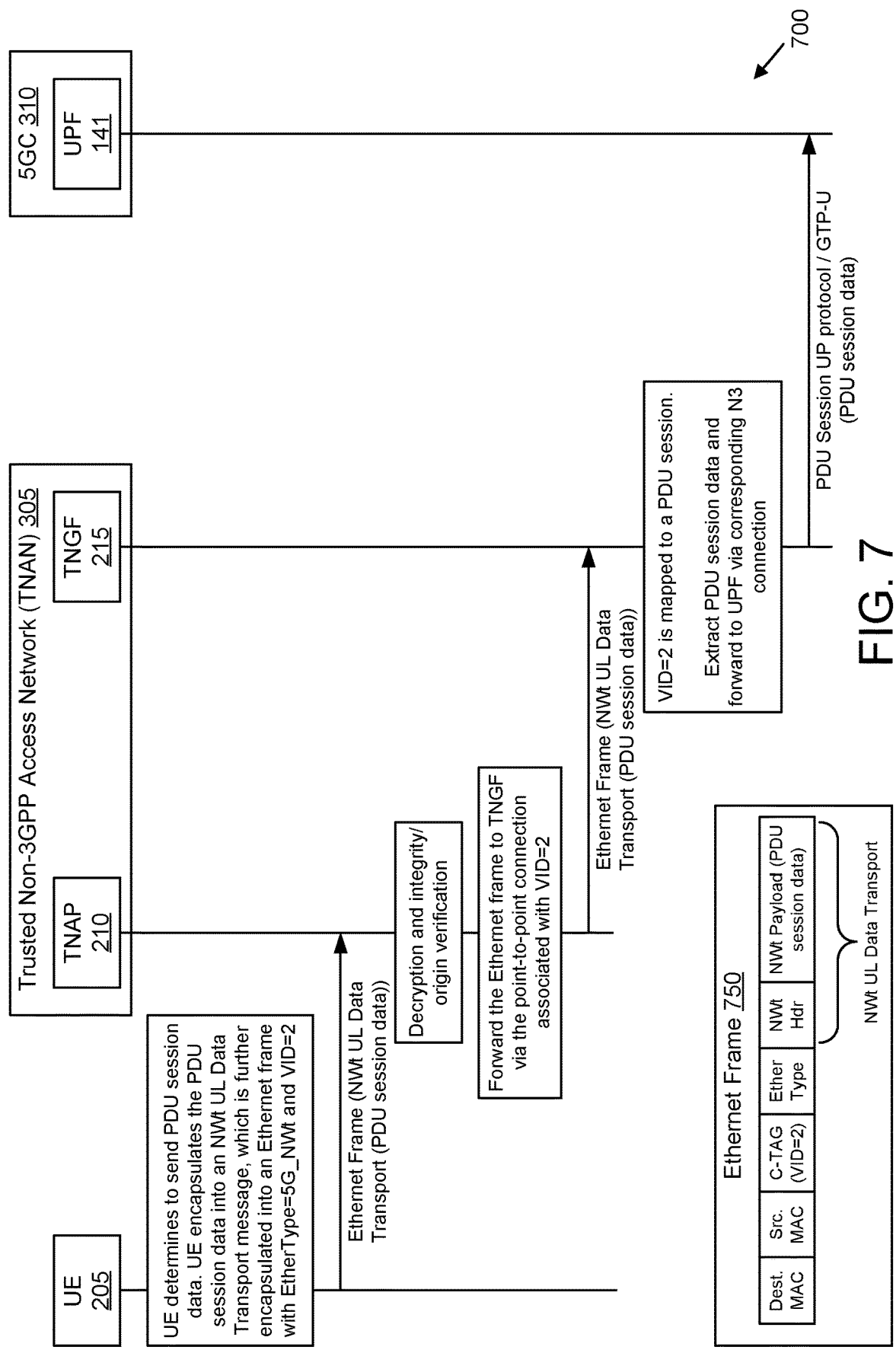
FIG. 7 illustrates an example of a procedure for forwarding Protocol Data Unit ("PDU") Session data from the UE to the User Plane Function ("UPF") using a user plane connection, in accordance with aspects of the present disclosure.

FIG. 7 illustrates an exemplary network procedure 700 for forwarding PDU Session data from the UE to the UPF using a user plane connection, in accordance with aspects of the present disclosure. Similar operation is conducted in the opposite direction (e.g., to send a PDU Session data from the first UPF 141 to the UE 205). The network procedure 700 involves the UE 205, the TNAN 305 (including a TNAP 210 and a TNGF 215), and the 5GC 310 (including the first UPF 141, other NFs in the 5GC 310 are not shown for ease of illustration).

The network procedure 700 begins and the UE 205 determines to send PDU Session data. The UE 205 encapsulates the PDU Session data into an NWt UL Data Transport message, which is further encapsulated into an Ethernet frame 750 with EtherType=5G_NWt and VID=2. The destination MAC is set to the MAC address of the TNGF 215, the source MAC is set to the MAC address of the UE 205, and the NWt header includes the QFI for the PDU Session data and indicates that the NWt payload contains PDU Session data. In this embodiment, the QFI for the PDU Session data is mapped to VLAN ID 2 (i.e., VID=2). The VLAN ID 2 in turn is mapped to an appropriate 802.11 TC.

After verifying the integrity and the origin of the Ethernet/802.11 frame, the TNAP 210 forwards the Ethernet/802.11 frame to the TNGF 215 via the point-to-point connection associated with VLAN ID 2. The TNGF 215 receives the NWt message, extracts the PDU Session data, and forwards the PDU Session data to the first UPF 141 via the corresponding N3 connection.

Figure 8:
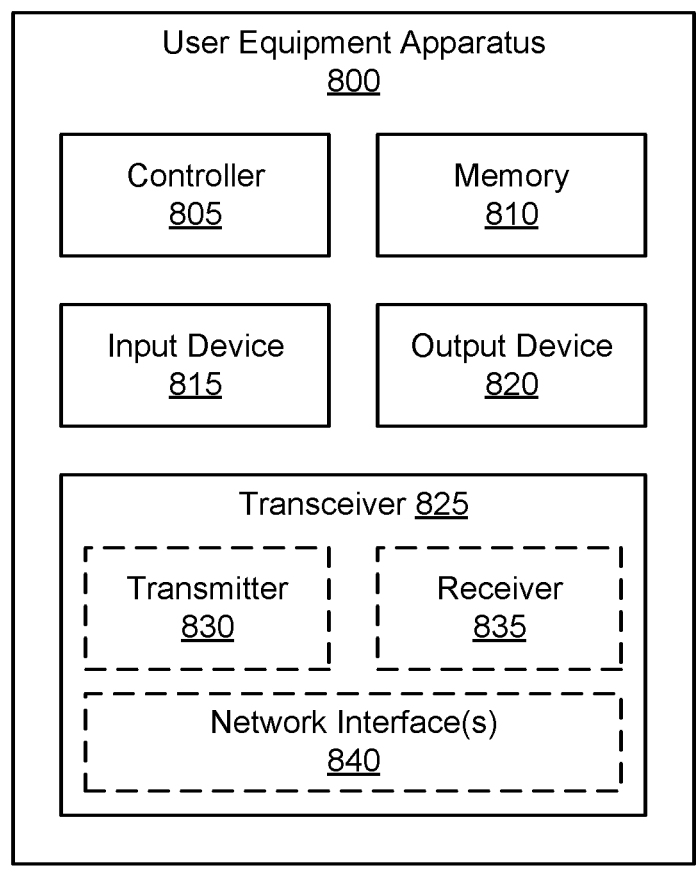
FIG. 8 illustrates an example of a UE apparatus that supports techniques for establishing network connections via a trusted gateway function, in accordance with aspects of the present disclosure.

FIG. 8 illustrates an exemplary UE apparatus 800 that may be used for establishing network connections via a trusted gateway function, in accordance with aspects of the present disclosure. The UE apparatus 800 may be one embodiment of the remote unit 105. Furthermore, the UE apparatus 800 may include a processor 805, a memory 810, an input device 815, an output device 820, a transceiver 825. In some embodiments, the input device 815 and the output device 820 are combined into a single device, such as a touch screen. In certain embodiments, the UE apparatus 800 does not include any input device 815 and/or output device 820.

As depicted, the transceiver 825 includes at least one transmitter 830 and at least one receiver 835. Additionally, the transceiver 825 may support at least one network interface 840. Here, the at least one network interface 840 facilitates communication with a TNAP and TNGF. Additionally, the at least one network interface 840 may include an interface used for communications with an eNB or gNB (e.g., using the "Uu" interface) an UPF, an SMF, and/or an AMF.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 communicates a first set of messages of a first type (e.g., NAS messages) with a mobile communication network via a non-3GPP access network. In such embodiments, the first set of messages of the first type are encapsulated with a first encapsulation protocol (e.g., NAS messages encapsulated in the EAP protocol) and the first set of messages of the first type initiate a registration procedure to the mobile communication network via the non-3GPP access network.

Additionally, the processor 805 receives a connection setup request via the non-3GPP access network and communicates subsequent messages of the first type with the mobile communication network via the non-3GPP access network. Here, the connection setup request contains information for activating a second encapsulation protocol (e.g., NWt protocol encapsulation) such that the subsequent messages of the first type are encapsulated with the second encapsulation protocol. Further, the subsequent messages of the first type complete the registration procedure. In some embodiments, the subsequent messages of the first type encapsulated with the second encapsulation protocol are marked with a specific EtherType (e.g., EtherType="NWt") and a VLAN ID.

In certain embodiments, the processor 805 further creates a first security key using the first set of messages of the first type and establishes a security association with the non-3GPP access network. Here, the security association uses a second security key derived from the first security key. In such embodiments, the connection setup request is received via the non-3GPP access network in response to establishing a security association with the non-3GPP access network.

In some embodiments, the processor 805 further establishes a CP connection using a first VLAN ID. Here, the CP connection is established by the connection setup request, which also contains the first VLAN ID. In such embodiments, messages on the CP connection are encapsulated with the second encapsulation protocol.

In some embodiments, the processor 805 further sends a request to establish a PDU session from the remote unit and receives one or more messages via the CP connection, each message requesting the establishment of a UP connection. In such embodiments, messages on the UP connection(s) are encapsulated with the second encapsulation protocol. In certain embodiments, each of the one or more UP connections is associated with a different VLAN ID. In further embodiments, the VLAN IDs associated with the one or more UP connections are different than a first VLAN ID associated with a CP connection. Moreover, each of the one or more UP connections may be associated with a different set of one or more quality of service flow identifiers.

In various embodiments, the processor 805 establishes a CP connection (e.g., NWt CP connection) with a non-3GPP access network node during a registration procedure with a mobile communication system via a non-3GPP access network (e.g., the TNAN 305). In such embodiments, messages on the CP connection are encapsulated with a first encapsulation protocol (e.g., NAS messages encapsulated in the NWt encapsulation). Additionally, the processor 805 controls the transceiver 825 to send a request to establish a data connection with the mobile communication network (e.g., sends a PDU Session Establishment request). Here, the request is sent via the CP connection.

Further, the processor 805 establishes a plurality of UP connections with the access network node in response to the mobile communication network accepting the request. Here, messages on each of the plurality of UP connections are encapsulated with the first encapsulation protocol (e.g., PDU session data are encapsulated within NWt packets). In certain embodiments, the control plane connection is associated with a first virtual local area network ("VLAN") and each of the plurality of user plane connections is associated with a different VLAN ID, wherein the first VLAN ID (associated with the control place connection) is different than the VLAN IDs associated with the UP connections.

In some embodiments, the requested data connection (e.g., the PDU Session) may comprise multiple QoS flows (e.g., mapped to different QFIs). In such embodiments, different ones of the multiple QoS flows are mapped to different ones of the plurality of UP connections. In certain embodiments, a single UP connection is associated with multiple QoS flows, where a single QoS flow is not associated with multiple UP connections.

The memory 810, in one embodiment, is a computer readable storage medium. In some embodiments, the memory 810 includes volatile computer storage media. For example, the memory 810 may include a Random Access Memory ("RAM"), including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media. In some embodiments, the memory 810 stores data relating to establishing network connections via a trusted gateway function, for example storing control plane connection contexts, user plane connection contexts, VLAN IDs, correlation between connections and VLAN IDs, and the like. In certain embodiments, the memory 810 also stores program code and related data, such as an operating system ("OS") or other controller algorithms operating on the UE apparatus 800 and one or more software applications.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, may include any known electronically controllable display or display device. The output device 820 may be designed to output visual, audible, and/or haptic signals. In some embodiments, the output device 820 includes an electronic display capable of outputting visual data to a user. For example, the output device 820 may include, but is not limited to, a liquid crystal display ("LCD"), a light-emitting diode ("LED") display, an organic LED ("OLED") display, a projector, or similar display device capable of outputting images, text, or the like to a user. As another, non-limiting, example, the output device 820 may include a wearable display such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, all or portions of the output device 820 may be located near the input device 815.

As discussed above, the transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver (or portions thereof) at particular times in order to send and receive messages. The transceiver 825 may include one or more transmitters 830 and one or more receivers 835. In certain embodiments, the one or more transmitters 830 and/or the one or more receivers 835 may share transceiver hardware and/or circuitry. For example, the one or more transmitters 830 and/or the one or more receivers 835 may share antenna(s), antenna tuner(s), amplifier(s), filter(s), oscillator(s), mixer(s), modulator/demodulator(s), power supply, and the like.

In various embodiments, the transceiver 825 is configured to communicate with 3GPP access network(s) 120 and the non-3GPP access network(s) 130. In some embodiments, the transceiver 825 implements modem functionality for the 3GPP access network(s) 120 and/or the non-3GPP access network(s) 130. In one embodiment, the transceiver 825 implements multiple logical transceivers using different communication protocols or protocol stacks, while using common physical hardware.

Figure 9:
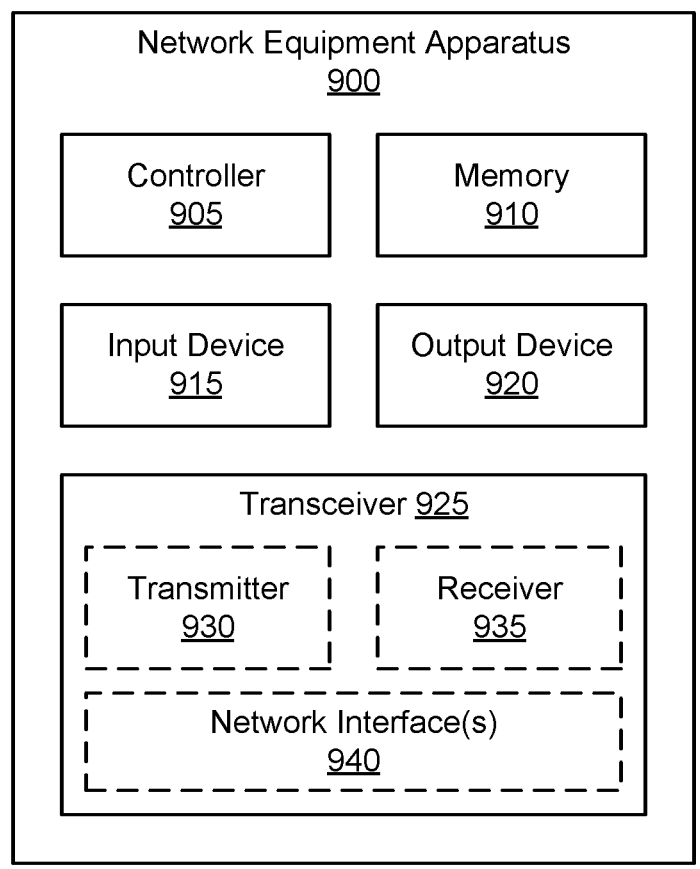
FIG. 9 illustrates an example of a network equipment ("NE") apparatus that supports techniques for establishing network connections via a trusted gateway function, in accordance with aspects of the present disclosure.

FIG. 9 illustrates an exemplary NE apparatus 900 that may be used for establishing network connections via a trusted gateway function, in accordance with aspects of the present disclosure. In some embodiments, the NE apparatus 900 may be one embodiment of the gateway function 135, the TNGF 215, and/or the like. Furthermore, the NE apparatus 900 may include a processor 905, a memory 910, an input device 915, an output device 920, and a transceiver 925. In some embodiments, the input device 915 and the output device 920 are combined into a single device, such as a touchscreen. In certain embodiments, the NE apparatus 900 may not include any input device 915 and/or output device 920.

As depicted, the transceiver 925 includes at least one transmitter 930 and at least one receiver 935. Additionally, the transceiver 925 may support at least one network interface 940, such as an "N3" interface used for communications between a user plane function (e.g., the first UPF 141) and an access network node (e.g., the gateway function 135 and/or the TNGF 215), and the like.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the processor 905 relays a first set of messages of a first type (e.g., NAS messages) between a remote unit and a mobile communication network via a non-3GPP access network. In such embodiments, the first set of messages of the first type are encapsulated with a first encapsulation protocol (e.g., NAS messages encapsulated in the EAP protocol). Further, the first set of messages of the first type initiate a registration procedure to the mobile communication network via the non-3GPP access network.

The processor 905 sends a connection setup request to the remote unit via the non-3GPP access network. Here, the connection setup request contains information for activating a second encapsulation protocol (e.g., NWt encapsulation). In certain embodiments, sending a connection setup request includes sending a request to establish a CP connection using a first VLAN ID. Here, messages over the CP connection are encapsulated with the second encapsulation protocol.

Additionally, the processor 905 relays subsequent messages of the first type between the remote unit and the mobile communication network via the non-3GPP access network. Here, the subsequent messages of the first type are encapsulated with the second encapsulation protocol (e.g., NAS encapsulated in the NWt encapsulation). Further, the subsequent messages of the first type complete the registration procedure. In certain embodiments, the subsequent messages of the first type encapsulated with the second encapsulation protocol are marked with a specific EtherType (e.g., EtherType="NWt") and a VLAN ID.

In certain embodiments, the processor 905 further receives a first security key (e.g., a TNGF key) from the mobile communication network and derives a second security key (e.g., a TNAP key) from the first security key. The processor 905 controls the transceiver 925 to forward the second security key to the non-3GPP access network (e.g., to a TNAP). Additionally, the processor 905 may receive an indication that a security association has been established for the remote unit in the non-3GPP access network, where the security association uses the second security key. In such embodiments, the connection setup request is sent to the remote unit via the non-3GPP access network in response to receiving the indication that a security association has been established for the remote unit in the non-3GPP access network.

In some embodiments, the processor 905 further receives a request to establish a PDU session from the mobile communication network. In response, the processor 905 establishes one or more UP connections with the remote unit. Here, messages on the one or more UP connections are encapsulated with the second encapsulation protocol. In certain embodiments, each of the one or more UP connections is associated with a different VLAN ID. Further, the VLAN IDs associated with the one or more UP connections are different than a first VLAN ID associated with a CP connection.

Each NWt UP connection may be used to carry the traffic of one or more QoS flows of a specific PDU session. Note that the traffic of a PDU session may be split to different "QoS flows," i.e., to different streams of data that are subject to different QoS handling. Here, each of the one or more UP connections may be associated with a different set of one or more quality of service flow identifiers.

In various embodiments, the processor 905 establishes a CP connection with a remote unit over a non-3GPP access network during a registration procedure of the remote unit to a mobile communication network. In such embodiments, messages on the CP connection are encapsulated with a first encapsulation protocol (e.g., NAS messages are encapsulated within NWt packets). The processor 905 controls the transceiver 925 to forward a request from the remote unit to establish a data connection (e.g., PDU Session) with the mobile communication network. Here, the request (e.g., PDU Session Establishment request) is received via the CP connection.

Additionally, the processor 905 establishes a plurality of UP connections with the remote unit in response to the mobile communication network accepting the request, wherein messages on each of the plurality of UP connections are encapsulated with the first encapsulation protocol (e.g., PDU session data are encapsulated within NWt packets). In certain embodiments, the control plane connection is associated with a first virtual local area network ("VLAN") and each of the plurality of user plane connections is associated with a different VLAN ID, wherein the first VLAN ID is different than the VLAN IDs associated with the UP connections.

In some embodiments, the data connection (e.g., PDU Session) comprises multiple QoS flows, wherein different ones of the multiple QoS flows are mapped to different ones of the plurality of UP connections. In certain embodiments, a single UP connection is associated with multiple QoS flows, where a single QoS flow is not associated with multiple UP connections.

The memory 910, in one embodiment, is a computer readable storage medium. In some embodiments, the memory 910 includes volatile computer storage media. For example, the memory 910 may include a RAM, including DRAM, SDRAM, and/or SRAM. In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media. In some embodiments, the memory 910 stores data relating to establishing network connections via a trusted gateway function, for example storing control plane connection contexts, user plane connection contexts, VLAN IDs, correlation between connections and VLAN IDs, and the like. In certain embodiments, the memory 910 also stores program code and related data, such as an OS or other controller algorithms operating on the NE apparatus 900 and one or more software applications.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, may include any known electronically controllable display or display device. The output device 920 may be designed to output visual, audible, and/or haptic signals. In some embodiments, the output device 920 includes an electronic display capable of outputting visual data to a user. For example, the output device 920 may include, but is not limited to, an LCD display, an LED display, an OLED display, a projector, or similar display device capable of outputting images, text, or the like to a user. As another, non-limiting example, the output device 920 may include a wearable display such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, all or portions of the output device 920 may be located near the input device 915.

The transceiver 925 communicates with one or more access network nodes and/or with one or more network functions of a mobile communication network. The transceiver 925 operates under the control of the processor 905 to transmit messages, data, and other signals and also to receive messages, data, and other signals. For example, the processor 905 may selectively activate the transceiver (or portions thereof) at particular times in order to send and receive messages. The transceiver 925 may include one or more transmitters 930 and one or more receivers 935. As discussed above, the transceiver 925 may support one or more network interfaces 940 for communicating with network functions in a mobile core network.

Figure 10:
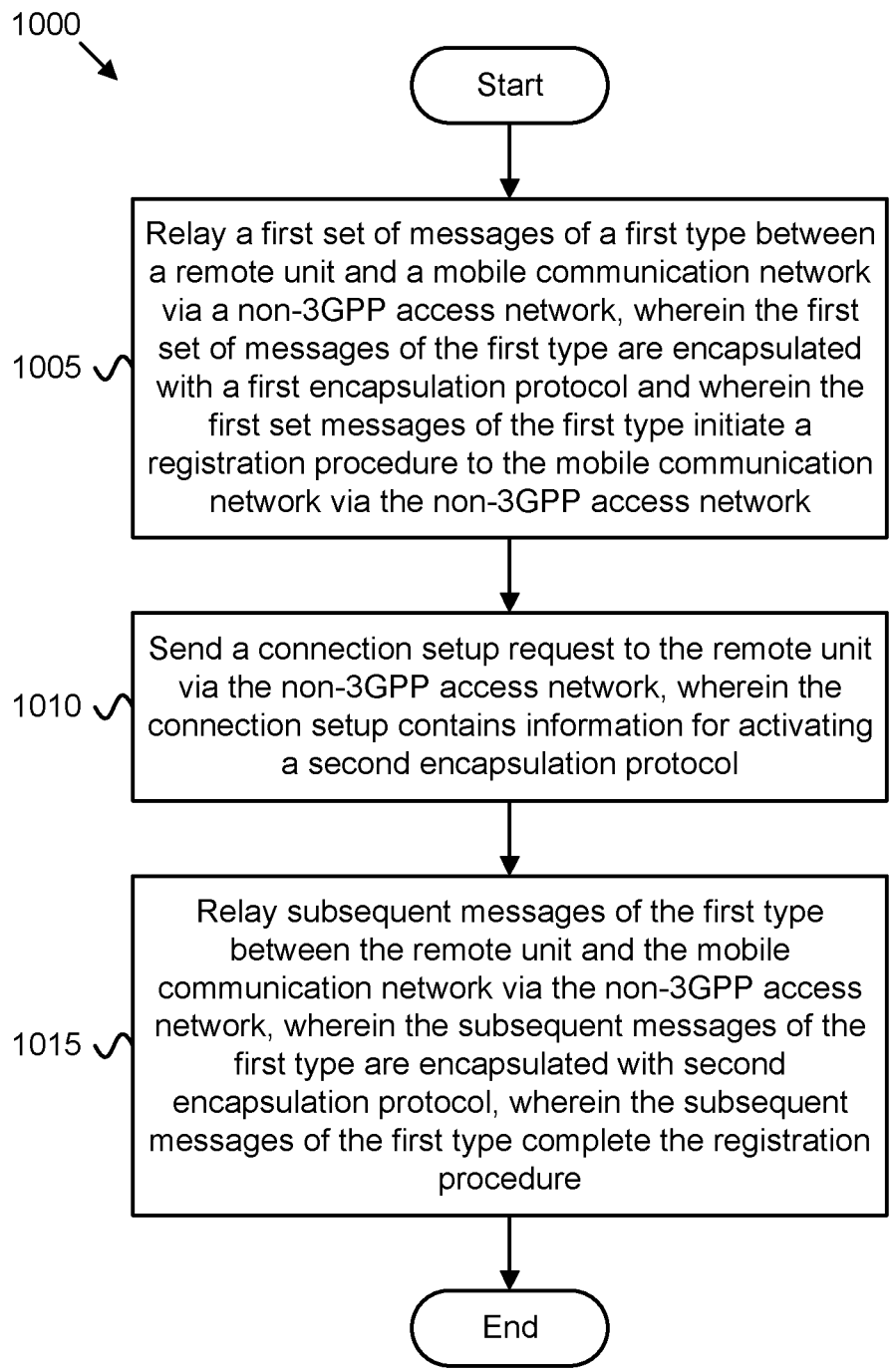
FIG. 10 illustrates an example of a first method that supports techniques for establishing network connections via a trusted gateway function, in accordance with aspects of the present disclosure.

FIG. 10 illustrates an exemplary method 1000 for establishing network connections via a trusted gateway function, in accordance with aspects of the present disclosure. In some embodiments, the method 1000 is performed by an apparatus, such as the gateway function 135, the TNGF 215, and/or the NE apparatus 900. In certain embodiments, the method 1000 may be performed by a processor executing program code, for example, a microcontroller, a microprocessor, a CPU, a GPU, an auxiliary processing unit, a FPGA, or the like.

The method 1000 begins and relays 1005 a first set of messages of a first type between a remote unit and a mobile communication network via a non-3GPP access network. Here, the first set of messages of the first type are encapsulated with a first encapsulation protocol. Additionally, the first set of messages of the first type initiates a registration procedure to the mobile communication network via the non-3GPP access network.

The method 1000 includes sending 1010 a connection setup request to the remote unit via the non-3GPP access network. Here, the connection setup request contains information for activating a second encapsulation protocol.

The method 1000 includes relaying 1015 subsequent messages of the first type between the remote unit and the mobile communication network via the non-3GPP access network. Here, the subsequent messages of the first type are encapsulated with the second encapsulation protocol. Additionally, the subsequent messages of the first type complete the registration procedure. The method 1000 ends.

Figure 11:
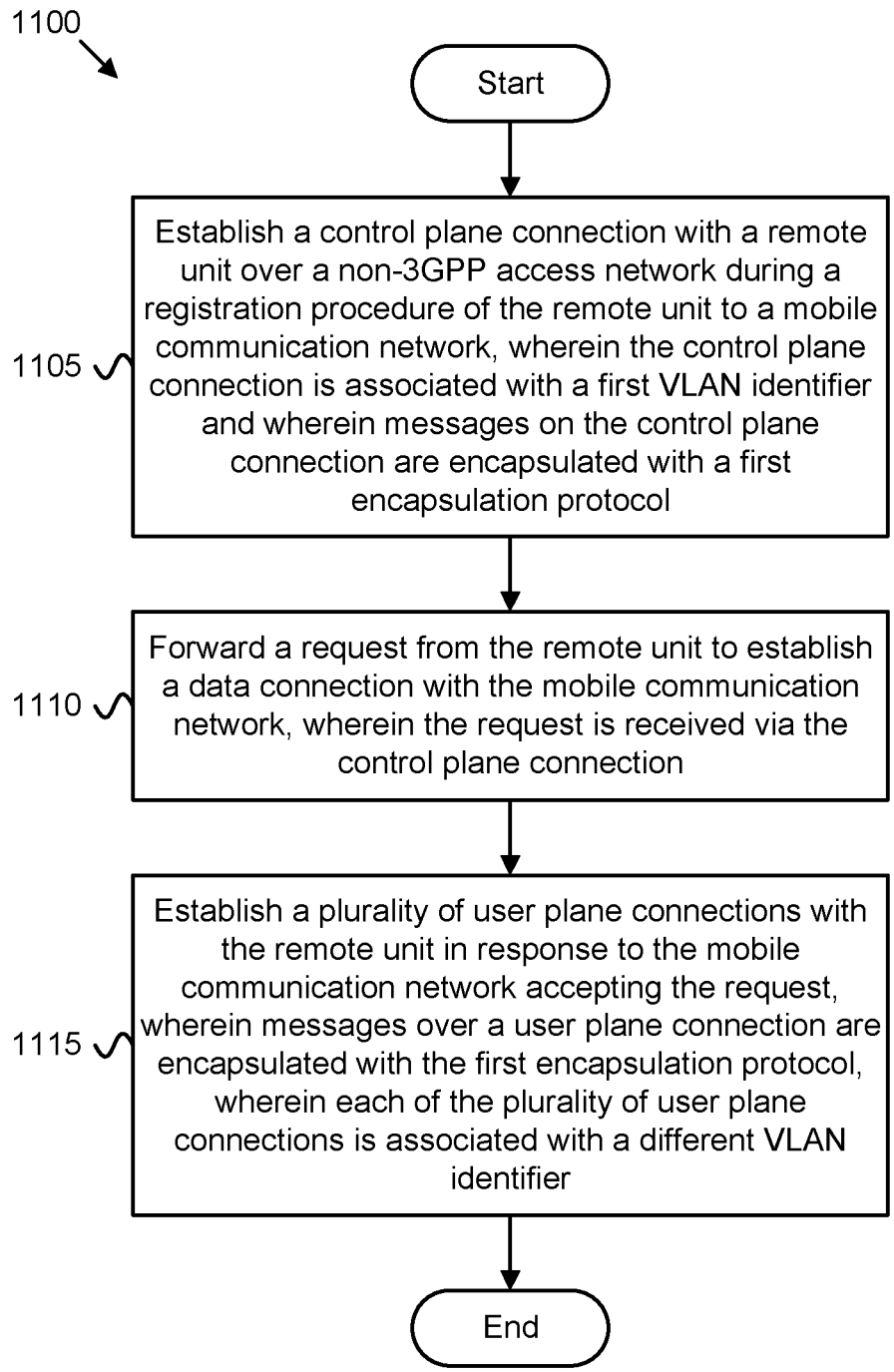
FIG. 11 illustrates an example of a second method that supports techniques for establishing network connections via a trusted gateway function, in accordance with aspects of the present disclosure.

FIG. 11 illustrates an exemplary method 1100 for establishing network connections via a trusted gateway function, in accordance with aspects of the present disclosure. In some embodiments, the method 1100 is performed by an apparatus, such as the gateway function 135, the TNGF 215, and/or the NE apparatus 900. In certain embodiments, the method 1100 may be performed by a processor executing program code, for example, a microcontroller, a microprocessor, a CPU, a GPU, an auxiliary processing unit, a FPGA, or the like.

The method 1100 begins and establishes 1105 a control plane connection with a remote unit over a non-3GPP access network during a registration procedure of the remote unit to a mobile communication network. Here, messages on the control plane connection are encapsulated with a first encapsulation protocol.

The method 1100 includes forwarding 1110 a request from the remote unit to establish a data connection with the mobile communication network. Here, the request is received via the control plane connection.

The method 1100 includes establishing 1115 a plurality of user plane connections with the remote unit in response to the mobile communication network accepting the request. Here, messages on each of the plurality of user plane connections are encapsulated with the first encapsulation protocol. The method 1100 ends. In certain embodiments, the control plane connection is associated with a first VLAN ID and each of the plurality of user plane connections is associated with a different VLAN ID, wherein the first VLAN ID is different than the VLAN IDs associated with the user plane connections.

Figure 12:
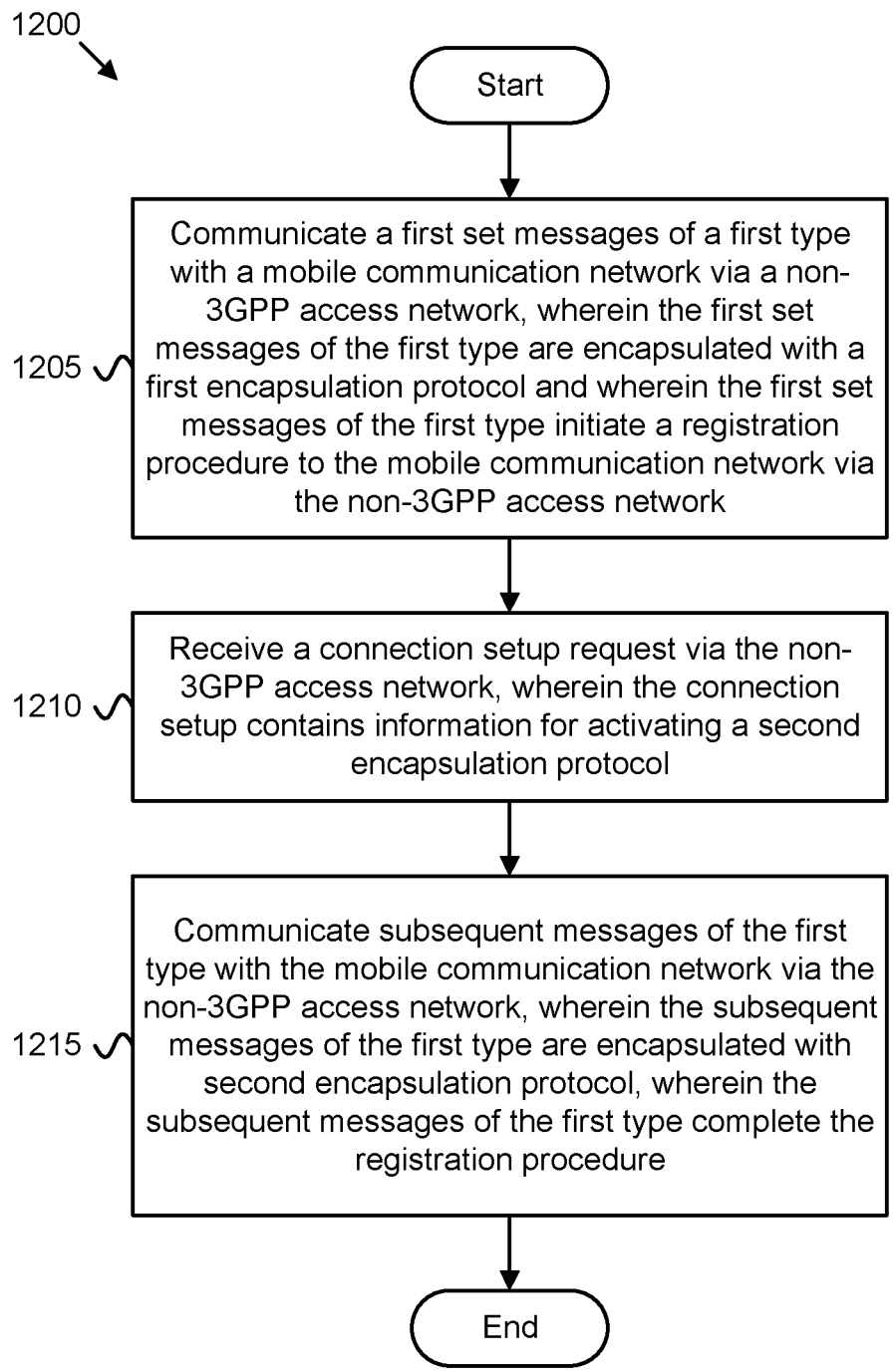
FIG. 12 illustrates an example of a third method that supports techniques for establishing network connections via a trusted gateway function, in accordance with aspects of the present disclosure.

FIG. 12 illustrates an exemplary method 1200 for establishing network connections via a trusted gateway function, in accordance with aspects of the present disclosure. In some embodiments, the method 1200 is performed by an apparatus, such as the remote unit 105, the UE 205, and/or the UE apparatus 800. In certain embodiments, the method 1200 may be performed by a processor executing program code, for example, a microcontroller, a microprocessor, a CPU, a GPU, an auxiliary processing unit, a FPGA, or the like.

The method 1200 begins and communicates 1205 a first set of messages of a first type with a mobile communication network via a non-3GPP access network. Here, the first set of messages of the first type are encapsulated with a first encapsulation protocol. Additionally, the first set of messages of the first type initiates a registration procedure to the mobile communication network via the non-3GPP access network.

The method 1200 includes receiving 1210 a connection setup request via the non-3GPP access network. Here, the connection setup request contains information for activating a second encapsulation protocol.

The method 1200 includes communicating 1215 subsequent messages of the first type with the mobile communication network via the non-3GPP access network. Here, the subsequent messages of the first type are encapsulated with the second encapsulation protocol. Additionally, the subsequent messages of the first type complete the registration procedure. The method 1200 ends.

Figure 13:
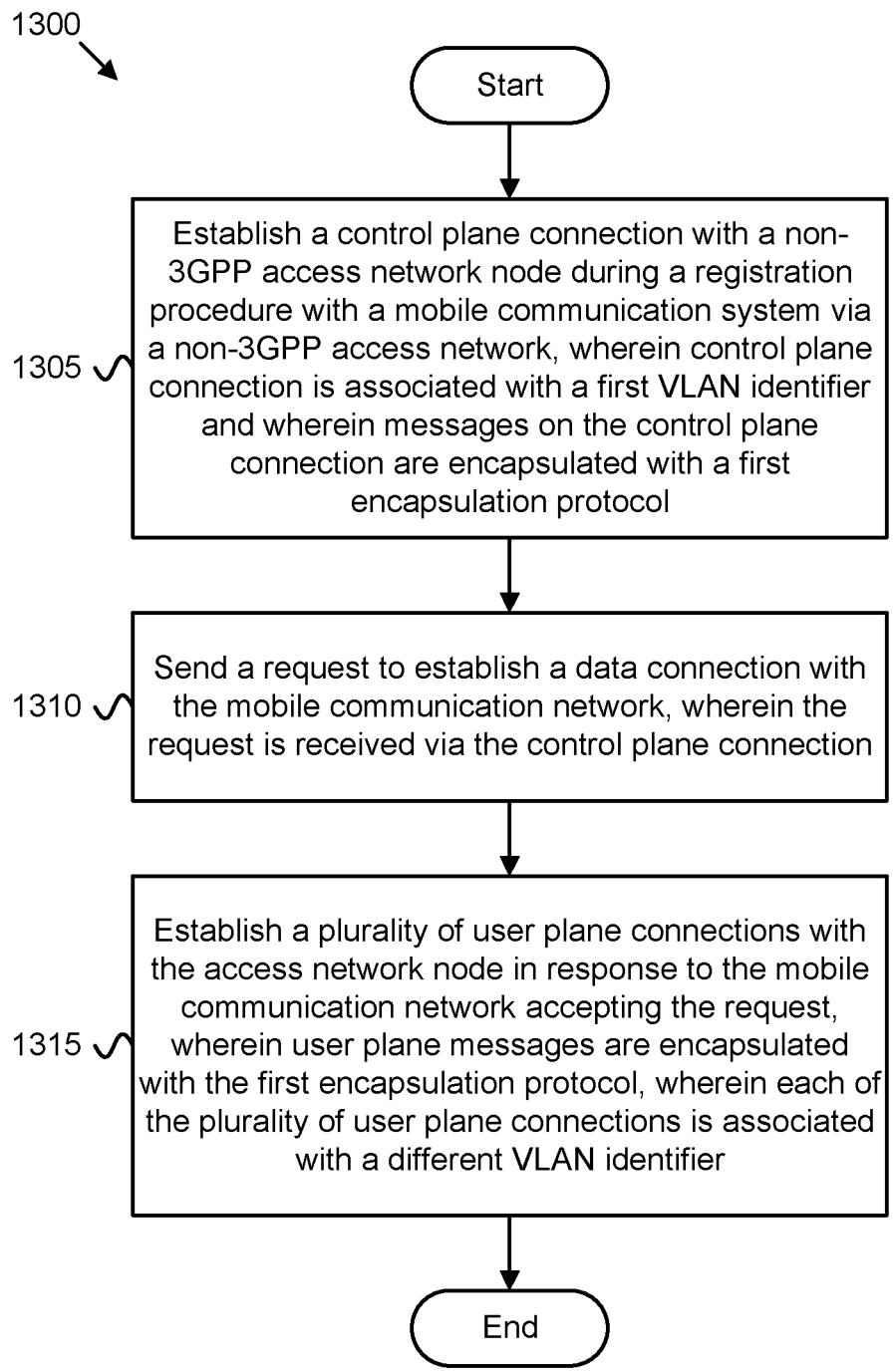
FIG. 13 illustrates an example of a fourth method that supports techniques for establishing network connections via a trusted gateway function, in accordance with aspects of the present disclosure.

FIG. 13 illustrates an exemplary method 1300 for establishing network connections via a trusted gateway function, in accordance with aspects of the present disclosure. In some embodiments, the method 1300 is performed by an apparatus, such as the remote unit 105, the UE 205, and/or the UE apparatus 800. In certain embodiments, the method 1300 may be performed by a processor executing program code, for example, a microcontroller, a microprocessor, a CPU, a GPU, an auxiliary processing unit, a FPGA, or the like.

The method 1300 begins and establishes 1305 a control plane connection with a non-3GPP access network node during a registration procedure with a mobile communication system via a non-3GPP access network. Here, messages on the control plane connection are encapsulated with a first encapsulation protocol.

The method 1300 includes sending 1310 a request to establish a data connection with the mobile communication network. Here, the request is sent via the control plane connection.

The method 1300 includes establishing 1315 a plurality of user plane connections with the access network node in response to the mobile communication network accepting the request. Here, messages on each of the plurality of user plane connections are encapsulated with the first encapsulation protocol. The method 1300 ends. In certain embodiments, the control plane connection is associated with a first VLAN ID and each of the plurality of user plane connections is associated with a different VLAN ID, wherein the first VLAN ID is different than the VLAN IDs associated with the user plane connections.

Disclosed herein is a first method for establishing network connections via a trusted gateway function. In various embodiments, the first method may be performed by the gateway function 135, the TNGF 215, and/or the NE apparatus 900. The first method includes relaying a first set of messages of a first type between a remote unit and a mobile communication network via a non-3GPP access network, wherein the first set of messages of the first type are encapsulated with a first encapsulation protocol and wherein the first set of messages of the first type initiate a registration procedure to the mobile communication network via the non-3GPP access network. The first method includes sending a connection setup request to the remote unit via the non-3GPP access network, wherein the connection setup request contains information for activating a second encapsulation protocol. The first method also includes relaying subsequent messages of the first type between the remote unit and the mobile communication network via the non-3GPP access network, wherein the subsequent messages of the first type are encapsulated with the second encapsulation protocol, wherein the subsequent messages of the first type complete the registration procedure.

In certain embodiments of the first method, the subsequent messages of the first type encapsulated with the second encapsulation protocol are marked with a specific EtherType and a VLAN ID.

In some embodiments, the first method further includes: receiving a first security key from the mobile communication network, deriving a second security key from the first security key, and forwarding the second security key to the non-3GPP access network. Moreover, the first method may further include receiving an indication that a security association has been established for the remote unit in the non-3GPP access network, wherein the security association uses the second security key. Additionally, the connection setup may be protected by the security association.

In certain embodiments of the first method, sending a connection setup request comprises sending a request to establish a control plane connection using a first VLAN ID, wherein messages over the control plane connection are encapsulated with the second encapsulation protocol.

In some embodiments, the first method further includes: receiving a request to establish a PDU session from the mobile communication network and establishing one or more user plane connections with the remote unit in response to receiving the request to establish a PDU session, wherein messages on the one or more user plane connections are encapsulated with the second encapsulation protocol. In such embodiments, each of the one or more user plane connections may be associated with a different VLAN ID. In further embodiments, the VLAN IDs associated with the one or more user plane connections are different than a first VLAN ID associated with a control plane connection. Additionally, each of the one or more user plane connections may be associated with a different set of one or more quality of service flow identifiers.

Disclosed herein is a second method for establishing network connections via a trusted gateway function. In various embodiments, the second method may be performed by the gateway function 135, the TNGF 215, and/or the NE apparatus 900. The second method includes establishing a control plane connection with a remote unit over a non-3GPP access network during a registration procedure of the remote unit to a mobile communication network, wherein messages on the control plane connection are encapsulated with a first encapsulation protocol. The second method includes forwarding a request from the remote unit to establish a data connection with the mobile communication network, wherein the request is received via the control plane connection. The second method also includes establishing a plurality of user plane connections with the remote unit in response to the mobile communication network accepting the request, wherein messages on each of the plurality of user plane connections are encapsulated with the first encapsulation protocol.

In certain embodiments of the second method, the data connection comprises multiple quality of service QoS flows, wherein different ones of the multiple QoS flows are mapped to different ones of the plurality of user plane connections. In certain embodiments of the second method, the control plane connection is associated with a first VLAN and each of the plurality of user plane connections is associated with a different VLAN ID, wherein the first VLAN ID is different than the VLAN IDs associated with the user plane connections.

Disclosed herein is a third method for establishing network connections via a trusted gateway function. In various embodiments, the third method may be performed by the remote unit 105, the UE 205, and/or the UE apparatus 800. The third method includes communicating a first set of messages of a first type with a mobile communication network via a non-3GPP access network, wherein the first set of messages of the first type are encapsulated with a first encapsulation protocol and wherein the first set of messages of the first type initiate a registration procedure to the mobile communication network via the non-3GPP access network. The third method includes receiving a connection setup request via the non-3GPP access network, wherein the connection setup request contains information for activating a second encapsulation protocol. The third method also includes communicating subsequent messages of the first type with the mobile communication network via the non-3GPP access network, wherein the subsequent messages of the first type are encapsulated with the second encapsulation protocol, wherein the subsequent messages of the first type complete the registration procedure.

In certain embodiments of the third method, the subsequent messages of the first type encapsulated with the second encapsulation protocol are marked with a specific EtherType and a VLAN ID.

In some embodiments, the third method further includes: creating a first security key using the first set of messages of the first type and establishing a security association with the non-3GPP access network. Here, the security association uses a second security key derived from the first security key. In further embodiments, the received via the non-3GPP access network in response to establishing a security association with the non-3GPP access network.

In some embodiments, the third method further includes: establishing a control plane connection using a first VLAN ID, wherein the control plane connection is established by the connection setup request that contains the first VLAN ID and wherein messages on the control plane connection are encapsulated with the second encapsulation protocol.

In some embodiments, the third method further includes: sending a request to establish a PDU session from the remote unit; and receiving one or more messages via the control plane connection, each message requesting the establishment of a user plane connection. Here, messages on a user plane connection are encapsulated with the second encapsulation protocol. In certain embodiments, each of the one or more user plane connections is associated with a different VLAN ID. Moreover, the VLAN IDs associated with the one or more user plane connections are different than a first VLAN ID associated with a control plane connection. Additionally, each of the one or more user plane connections may be associated with a different set of one or more quality of service flow identifiers.

Disclosed herein is a fourth method for establishing network connections via a trusted gateway function. In various embodiments, the first method may be performed by the remote unit 105, the UE 205, and/or the UE apparatus 800. establishing a control plane connection with a non-3GPP access network node during a registration procedure with a mobile communication system via a non-3GPP access network, wherein messages on the control plane connection are encapsulated with a first encapsulation protocol. The fourth method includes sending a request to establish a data connection with the mobile communication network, wherein the request is sent via the control plane connection. The fourth method also includes establishing a plurality of user plane connections with the access network node in response to the mobile communication network accepting the request, wherein messages on each of the plurality of user plane connections are encapsulated with the first encapsulation protocol.

In certain embodiments of the fourth method, the data connection comprises multiple QoS flows, wherein different ones of the multiple QoS flows are mapped to different ones of the plurality of user plane connections. In certain embodiments of the fourth method, the control plane connection is associated with a first VLAN and each of the plurality of user plane connections is associated with a different VLAN ID, wherein the first VLAN ID is different than the VLAN IDs associated with the user plane connections.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a RAM, a read-only memory ("ROM"), an erasable programmable read-only memory ("EPROM"), a Flash memory, a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described above with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
at least one memory; and
at least one processor coupled with the at least one memory and configured to cause the apparatus to:
relay, via a non-3GPP access network, a first set of messages between a user equipment (UE) and a mobile communication network, wherein the first set of messages are encapsulated with a first encapsulation protocol, and wherein the first set of messages initiates a registration procedure to the mobile communication network via the non-3GPP access network;
transmit a request message to the UE via the non-3GPP access network, wherein the request message includes information for activating a security association; and
relay subsequent messages between the UE and the mobile communication network via the non-3GPP access network, wherein the subsequent messages are protected by the security association, and wherein the subsequent messages complete the registration procedure.

2. The apparatus of claim 1, wherein the at least one processor is further configured to cause the apparatus to:
receive a first security key from the mobile communication network;
derive a second security key from the first security key; and
forward the second security key to the non-3GPP access network, wherein the security association uses the first security key.

3. The apparatus of claim 2, wherein the at least one processor is further configured to cause the apparatus to:
receive an indication that a second security association has been established in the non-3GPP access network using the second security key, and
transmit a setup message in response to the indication that the second security association has been established.

4. The apparatus of claim 3, wherein the setup message is used for activating a second encapsulation protocol, and wherein the subsequent messages are encapsulated with the second encapsulation protocol.

5. The apparatus of claim 4, wherein the subsequent messages are marked with an EtherType and a virtual local area network (VLAN) identifier.

6. The apparatus of claim 4, wherein to transmit the setup message, the at least one processor is configured to cause the apparatus to transmit a request to establish a control plane connection using a first virtual local area network (VLAN) identifier, wherein messages over the control plane connection are encapsulated with the second encapsulation protocol.

7. The apparatus of claim 1, wherein the at least one processor is configured to cause the apparatus to:
receive a request to establish a protocol data unit (PDU) session from the mobile communication network; and
establish one or more user plane connections with the UE in response to the request to establish the PDU session, wherein messages on the one or more user plane connections are protected by the security association.

8. The apparatus of claim 7, wherein each of the one or more user plane connections is associated with a different virtual local area network (VLAN) identifier.

9. The apparatus of claim 8, wherein a respective VLAN identifier associated with the one or more user plane connections is different than a VLAN identifier associated with a control plane connection.

10. The apparatus of claim 7, wherein each of the one or more user plane connections is associated with a different set of one or more quality of service flow (QoS) identifiers.

11. The apparatus of claim 1, wherein the at least one processor is configured to cause the apparatus to receive a connection setup request via the non-3GPP access network in response to a transmission of the request message, and wherein the connection setup request is used for activating a second encapsulation protocol.

12. The apparatus of claim 1, wherein the at least one processor is configured to cause the apparatus to:
transmit the request message in response to receiving a first security key from the mobile communication network; and
activate the security association using the first security key.

13. The apparatus of claim 1, wherein the first encapsulation protocol comprises an extensible authentication protocol (EAP), and wherein the at least one processor is configured to cause the apparatus to encapsulate the subsequent messages with a second encapsulation protocol.

14. A user equipment (UE) for wireless communication, comprising:
at least one memory:
at least one processor coupled with the at least one memory and configured to cause the UE to:
communicate a first set of messages with a mobile communication network via a non-3GPP access network, wherein the first set of messages are encapsulated with a first encapsulation protocol, and wherein the first set of messages initiates a registration procedure to the mobile communication network via the non-3GPP access network;
receive a setup message via the non-3GPP access network, wherein the setup message includes information to activate a security association; and
communicate subsequent messages with the mobile communication network via the non-3GPP access network, wherein the subsequent messages are protected by the security association, and wherein the subsequent messages complete the registration procedure.

15. The UE of claim 11, wherein the at least one processor is further configured to cause the UE to:
create a security key using the first set of messages, wherein the security association uses the security key.

16. The UE of claim 15, wherein the setup message is received via the non-3GPP access network in response to establishment of a second security association with the non-3GPP access network.

17. The UE of claim 14, wherein the setup message is used for activating a second encapsulation protocol, and wherein the subsequent messages are encapsulated with the second encapsulation protocol.

18. The UE of claim 17, wherein the subsequent messages are marked with an EtherType and a virtual local area network (VLAN) identifier.

19. The UE of claim 17, wherein the at least one processor is further configured to cause the UE to establish a control plane connection using a first virtual local area network (VLAN) identifier, wherein messages over the control plane connection are encapsulated with the second encapsulation protocol.

20. The UE of claim 14, wherein the at least one processor is further configured to cause the UE to:
transmit a request to establish a protocol data unit (PDU) session; and
receive one or more messages via a control plane connection, each message requesting the establishment of a user plane connection, wherein messages on a respective user plane connection are protected by the security association.

21. An apparatus comprising:
at least one memory; and
at least one processor coupled with the at least one memory and configured to cause the apparatus to:
establish a signaling connection with a non-3GPP access network node during a registration procedure with a mobile communication network via a non-3GPP access network, wherein messages on the signaling connection are encapsulated with a first encapsulation protocol;
transmit a request to establish a data connection with the mobile communication network, wherein the request is sent via the signaling connection; and
establish a plurality of user plane connections with the non-3GPP access network node in response to the mobile communication network accepting the request, wherein messages on each of the plurality of user plane connections are encapsulated with the first encapsulation protocol.

22. The apparatus of claim 21, wherein the data connection comprises multiple quality of service (QOS) flows, wherein different QoS flows of the multiple QoS flows are mapped to different user plane connections of the plurality of user plane connections.

23. The apparatus of claim 21, wherein the signaling connection is associated with a first virtual local area network (VLAN) and each of the plurality of user plane connections is associated with a different VLAN identifier, wherein an identifier of the first VLAN is different than a respective VLAN identifier associated with the user plane connections.

\* \* \* \* \*